(12) United States Patent
Riley et al.

(10) Patent No.: US 7,480,085 B2
(45) Date of Patent: Jan. 20, 2009

(54) OPERATIONAL MODE PERFORMANCE OF A HOLOGRAPHIC MEMORY SYSTEM

(75) Inventors: Brian S. Riley, Firestone, CO (US); Ian R. Redmond, Boulder, CO (US); Aaron Wegner, Longmont, CO (US)

(73) Assignee: Inphase Technologies, Inc., Longmont, CO (US)

( * ) Notice: Subject to any disclaimer, the term of this patent is extended or adjusted under 35 U.S.C. 154(b) by 337 days.

(21) Appl. No.: 11/440,448

(22) Filed: May 25, 2006

(65) Prior Publication Data

US 2006/0291023 A1 Dec. 28, 2006

Related U.S. Application Data

(60) Provisional application No. 60/684,531, filed on May 26, 2005.

(51) Int. Cl.
G03H 1/04 (2006.01)

(52) U.S. Cl. .................... 359/35; 359/30; 359/1

(58) Field of Classification Search .......... 359/35
See application file for complete search history.

(56) References Cited

U.S. PATENT DOCUMENTS

| | | | |
|---|---|---|---|
| 5,058,124 A | 10/1991 | Cameron et al. | |
| 5,066,088 A | 11/1991 | Davies et al. | |
| 5,123,073 A | 6/1992 | Pimpinella | |
| 5,499,732 A | 3/1996 | Nishimoto | |
| 5,500,910 A | 3/1996 | Boudreau et al. | |
| 5,692,083 A | 11/1997 | Bennett | |
| 5,710,672 A | 1/1998 | Roberts et al. | |
| 5,719,691 A | 2/1998 | Curtis et al. | |
| 5,886,971 A | 3/1999 | Feldman et al. | |
| 5,896,359 A * | 4/1999 | Stoll | 369/103 |
| 5,912,872 A | 6/1999 | Feldman et al. | |
| 5,932,045 A | 8/1999 | Campbell et al. | |
| 5,956,106 A | 9/1999 | Petersen et al. | |
| 6,047,008 A | 4/2000 | Funakawa | |
| 6,081,381 A | 6/2000 | Shalapenok et al. | |
| 6,103,454 A | 8/2000 | Dhar et al. | |
| 6,104,690 A | 8/2000 | Feldman et al. | |
| 6,137,601 A | 10/2000 | Khoury et al. | |

(Continued)

FOREIGN PATENT DOCUMENTS

WO WO 2005/059902 A3 6/2005

OTHER PUBLICATIONS

Y. Nakayama, et al., "Diffuser with Pseudorandom Phase Sequence," *Opt. Soc. Am.*, vol. 69 (No. 10), (Oct. 1979), pp. 1367-1372.

(Continued)

*Primary Examiner*—Fayez G Assaf
(74) *Attorney, Agent, or Firm*—Jagtiani + Guttag

(57) ABSTRACT

Aspects of the present invention are generally directed to a holographic system. Generally, aspects of the present invention are directed to allocating power of a light beam generated by a coherent light source among the various discrete light beams used in a holographic system. Specifically, a variable optical divider is incorporated into an optical steering subsystem of the holographic memory system to redirect the coherent light beam into one or more discrete light beams, and to dynamically allocate power of the coherent light beam among the discrete light beams.

10 Claims, 12 Drawing Sheets

U.S. PATENT DOCUMENTS

| | | | |
|---|---|---|---|
| 6,265,240 | B1 | 7/2001 | Dautartas et al. |
| 6,344,148 | B1 | 2/2002 | Park et al. |
| 6,389,045 | B1 | 5/2002 | Mann et al. |
| 6,414,763 | B1 | 7/2002 | Hesselink et al. |
| 6,449,627 | B1 | 9/2002 | Baer et al. |
| 6,482,551 | B1 | 11/2002 | Dhar et al. |
| 6,614,566 | B1 | 9/2003 | Curtis et al. |
| 6,650,447 | B2 | 11/2003 | Curtis et al. |
| 6,743,552 | B2 | 6/2004 | Setthachayanon et al. |
| 6,747,257 | B1 | 6/2004 | Farnsworth et al. |
| 6,765,061 | B2 | 7/2004 | Dhar et al. |
| 6,768,426 | B2 | 7/2004 | Nekado et al. |
| 6,780,546 | B2 | 8/2004 | Trentler et al. |
| 6,796,697 | B1 | 9/2004 | Bragg et al. |
| 6,862,121 | B2 | 3/2005 | Psaltis et al. |
| 6,909,529 | B2 | 6/2005 | Curtis |
| 6,925,225 | B2 | 8/2005 | Engel et al. |
| 6,940,801 | B1 * | 9/2005 | Ishii et al. ............. 369/112.01 |
| 6,956,998 | B2 | 10/2005 | Shahar et al. |
| 6,992,805 | B2 | 1/2006 | Ingwall et al. |
| 7,027,197 | B2 | 4/2006 | Newswanger et al. |
| 7,092,133 | B2 | 8/2006 | Anderson et al. |
| 2003/0206320 | A1 | 11/2003 | Cole et al. |
| 2004/0027625 | A1 | 2/2004 | Trentler et al. |
| 2004/0027668 | A1 | 2/2004 | Ayres |
| 2004/0223330 | A1 | 11/2004 | Broude et al. |
| 2005/0013231 | A1 | 1/2005 | Kawano et al. |
| 2005/0041000 | A1 | 2/2005 | Plut |
| 2005/0141810 | A1 | 6/2005 | Vaez-Iravani et al. |
| 2005/0146762 | A1 | 7/2005 | Hoogland et al. |
| 2005/0190451 | A1 | 9/2005 | Hansen |
| 2005/0270855 | A1 | 12/2005 | Earhart et al. |
| 2005/0270856 | A1 | 12/2005 | Earhart et al. |
| 2005/0286388 | A1 | 12/2005 | Ayres et al. |
| 2006/0274393 | A1 | 12/2006 | Fotheringham et al. |
| 2006/0274394 | A1 | 12/2006 | Riley et al. |
| 2006/0275670 | A1 | 12/2006 | Riley et al. |
| 2006/0279818 | A1 | 12/2006 | Ayres et al. |
| 2006/0279819 | A1 | 12/2006 | Krneta et al. |
| 2006/0279820 | A1 | 12/2006 | Riley et al. |
| 2006/0279821 | A1 | 12/2006 | Riley et al. |
| 2006/0279822 | A1 | 12/2006 | Krneta et al. |
| 2006/0279823 | A1 | 12/2006 | Riley et al. |
| 2006/0279824 | A1 | 12/2006 | Riley et al. |
| 2006/0280096 | A1 | 12/2006 | Riley et al. |
| 2006/0281021 | A1 | 12/2006 | Riley et al. |
| 2006/0291022 | A1 | 12/2006 | Redmond et al |
| 2006/0291023 | A1 | 12/2006 | Riley et al. |

OTHER PUBLICATIONS

Smothers, et al., "Photopolymers for Holography," *SPIE OE/Laser Conference*, (Los Angeles, Calif., 1990), pp.: 1212-1203.

Psaltis, et al., "Holographic Memories," *Scientific American*, Nov. 1995.

Dhar, L., et al., "Recording Media That Exhibit High Dynamic Range for Holographic Storage," *Optics Letters*, 24, (1999): pp. 487 et. seq.

Dickey, "Laser Beam Shaping," Optics & Photonics News (Apr. 2003), pp. 30-35.

Masters, A., et al., "Beam-Shaping Optics Expand Excimer Laser Applications,"Laser Focus World (Jun. 2005).

Fuertes, J.M., et al., "Absolute Type Shaft Encoding Using LFSR Sequences With Prescribed Length".

McLeod, et al. "Micro-Holographic Multi-Layer Optical Disk Data Storage," *International Symposium on Optical Memory and Optical Data Storage* (Jul. 2005).

Shelby, "Media Requirements for Digital Holographic Data Storage," *Holographic Data Storage*, Section 1.3 (Coufal, Psaltis, Sincerbox Eds. 2003).

PCT/US2007/06094 International Search Report and the Written Opinion of the International Searching Authority, or the Declaration, mailed Aug. 22, 2008.

PCT/US2006/19906 International Search Report and the Written Opinion of the International Searching Authority, or the Declaration, mailed Sep. 16, 2008.

* cited by examiner

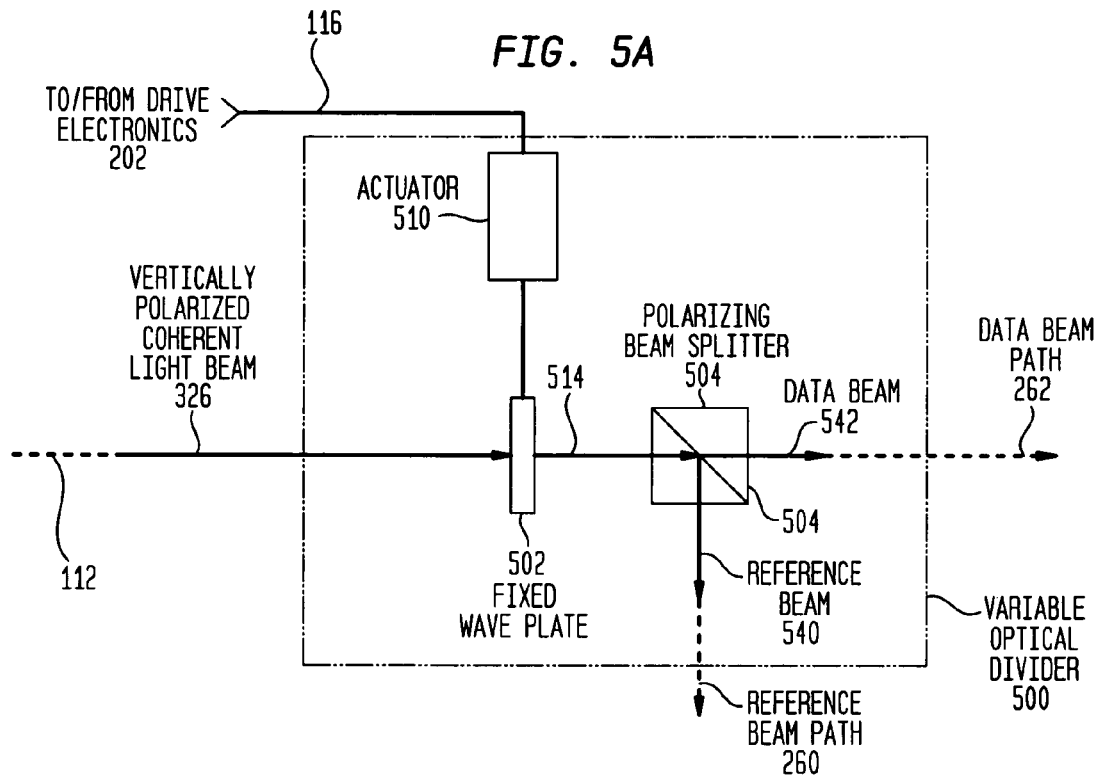
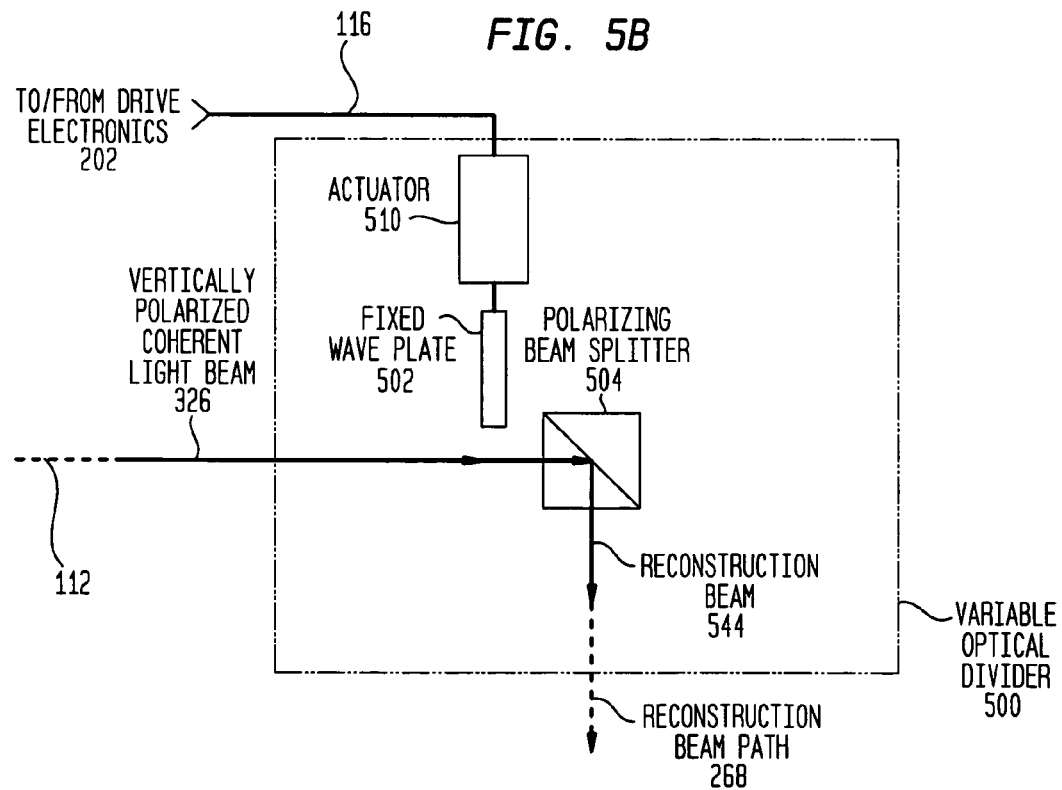

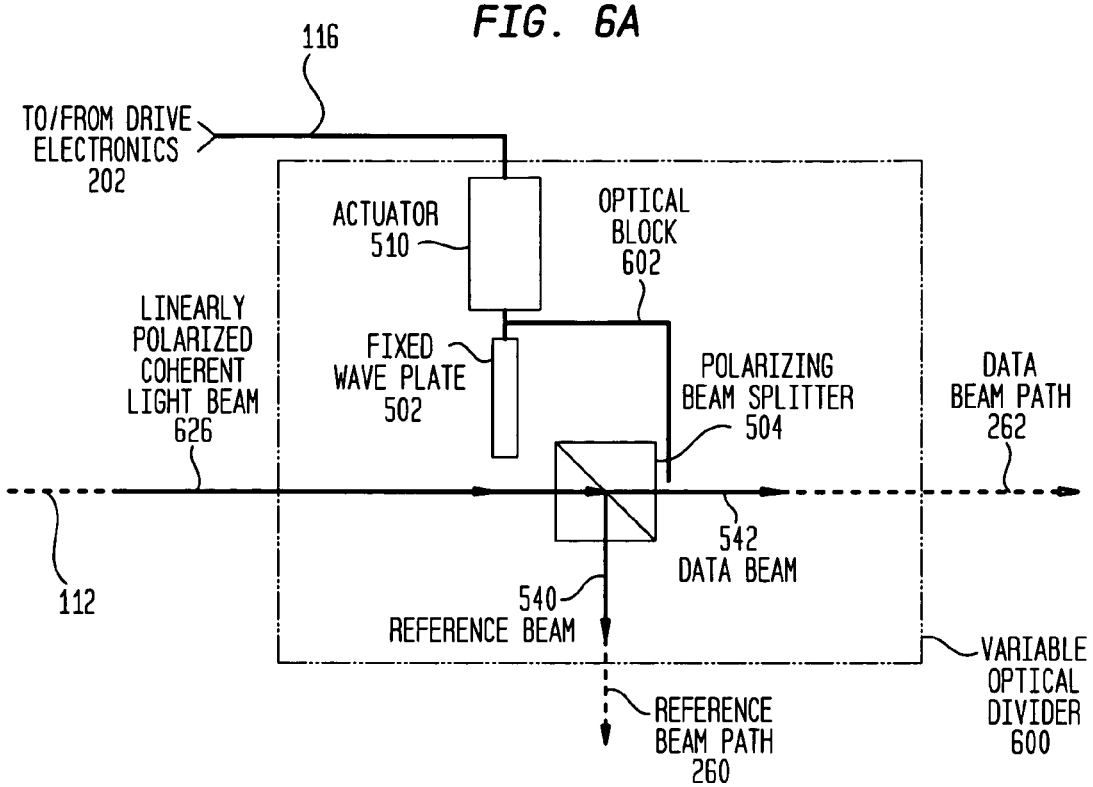
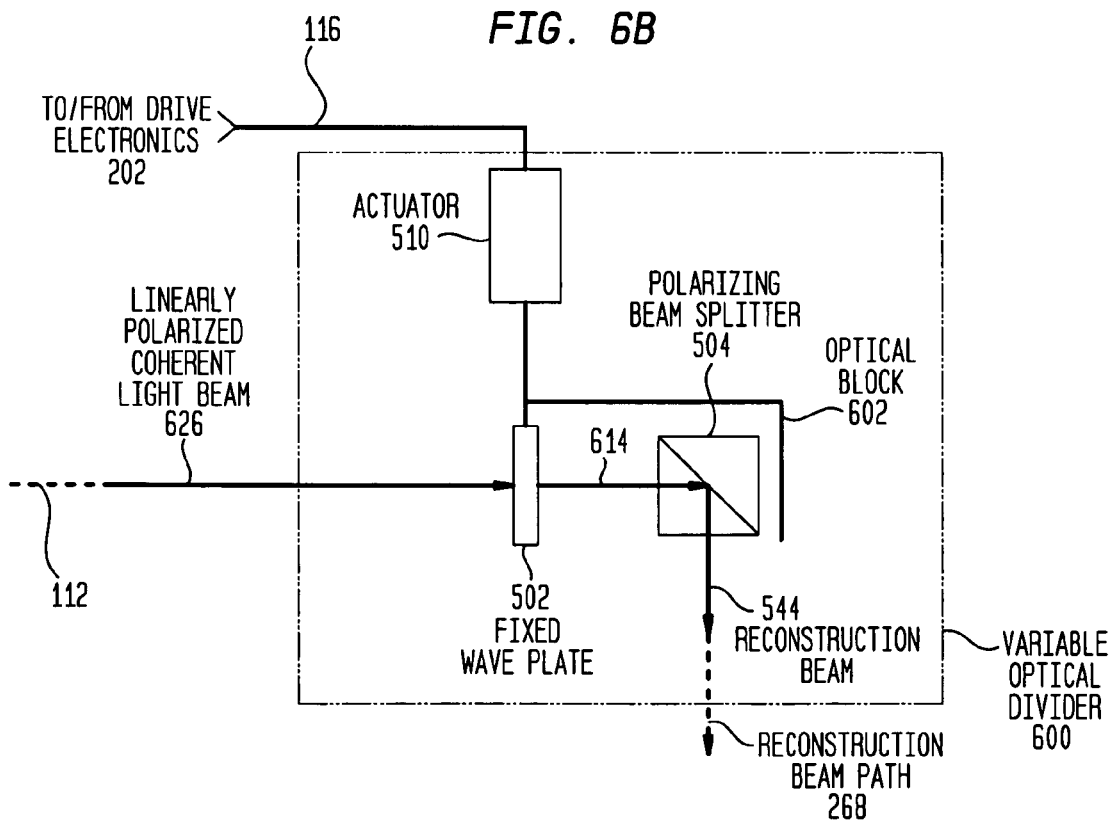

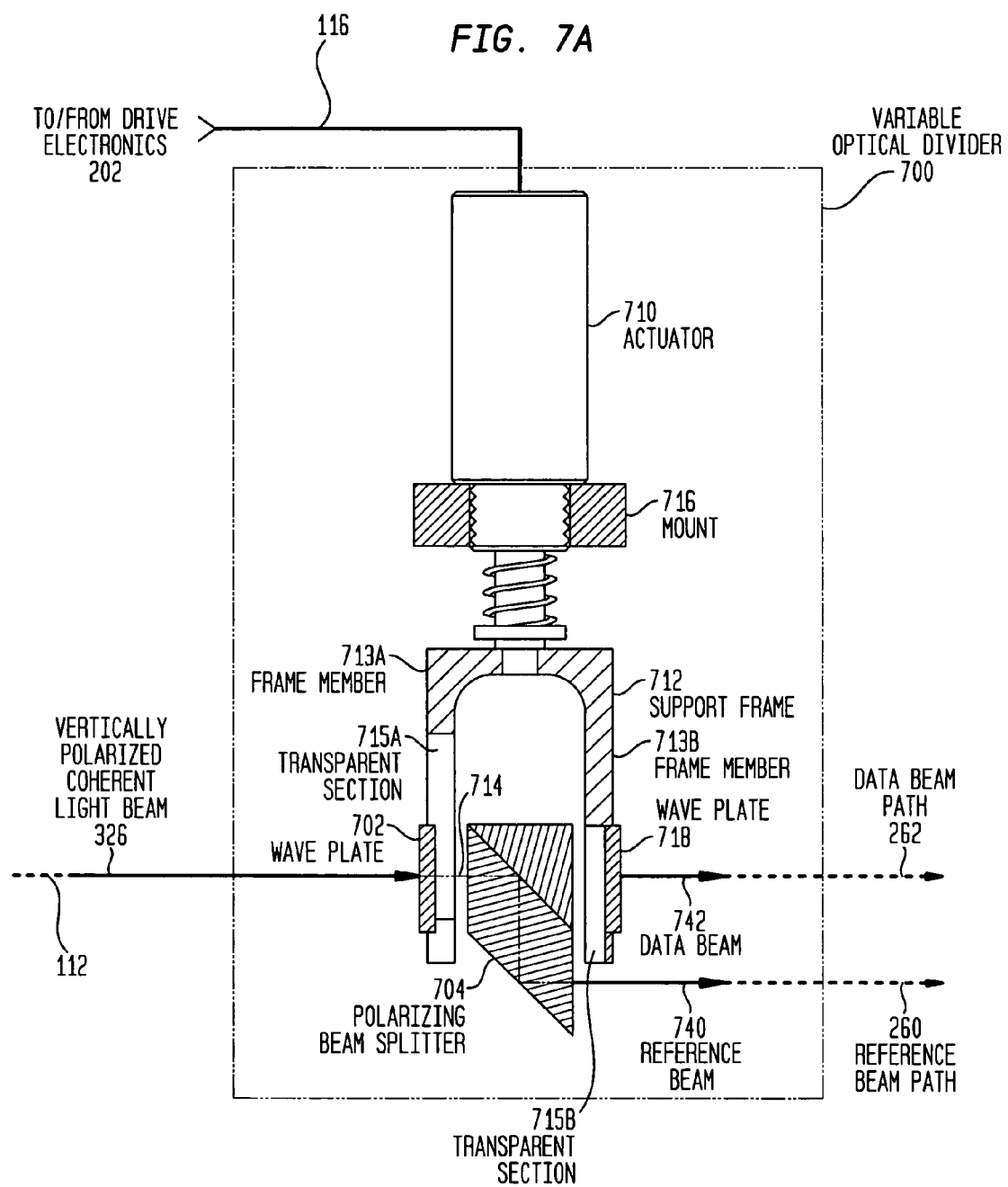

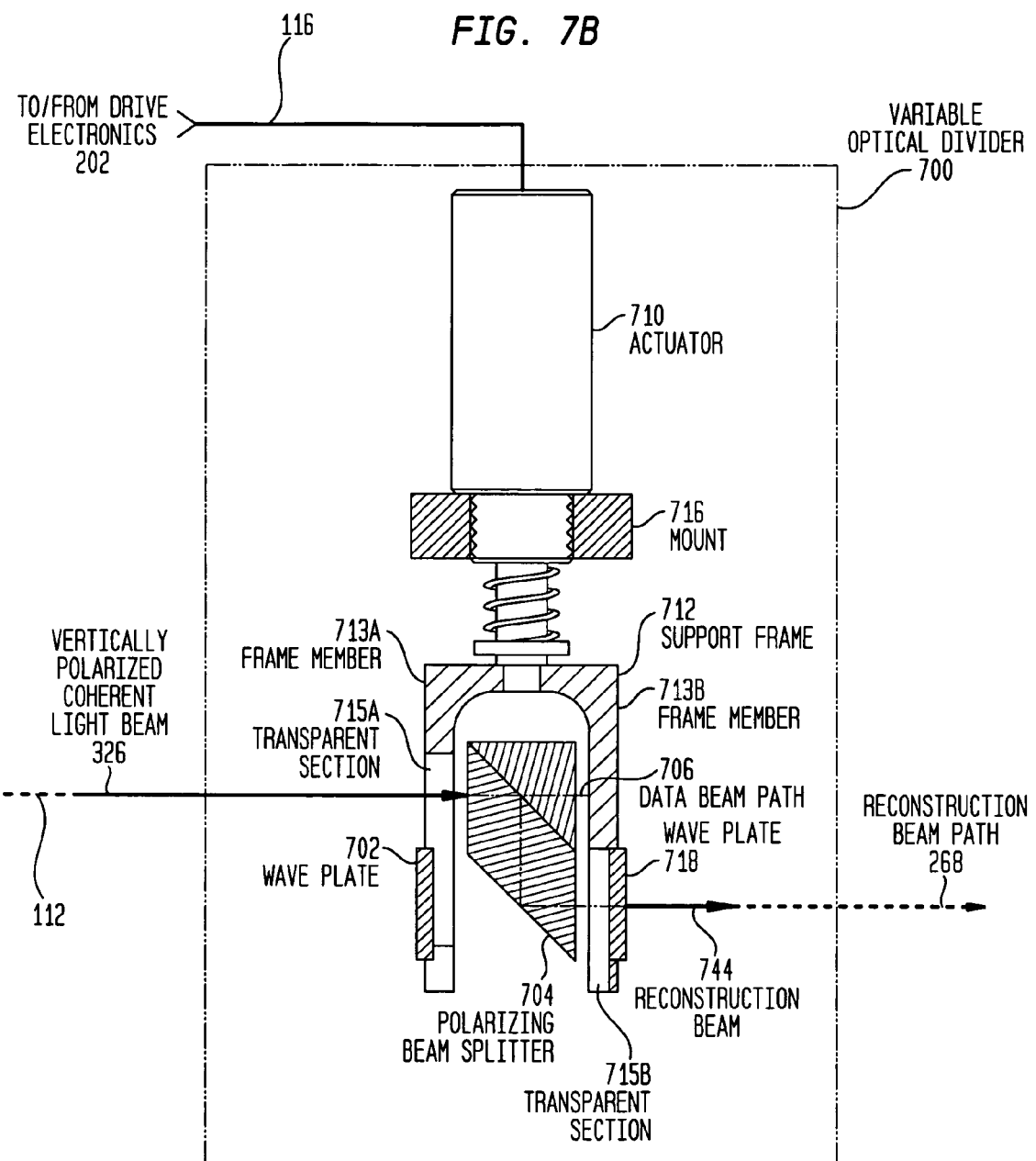

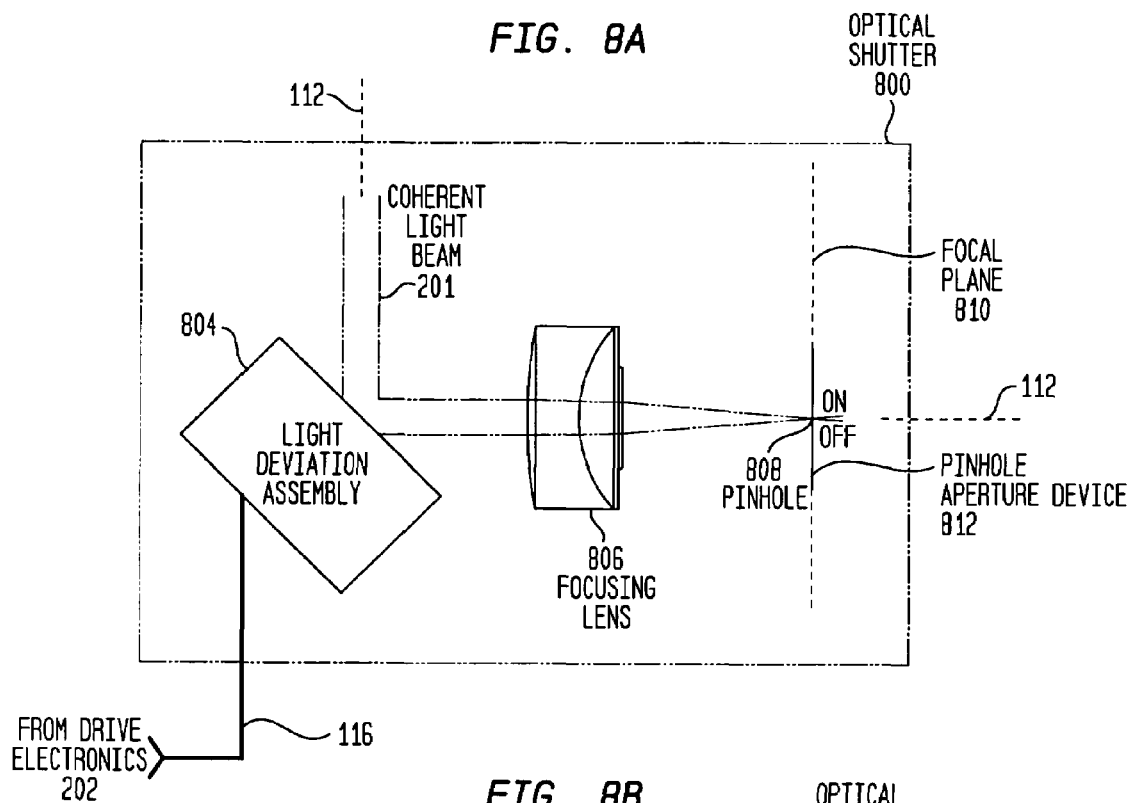
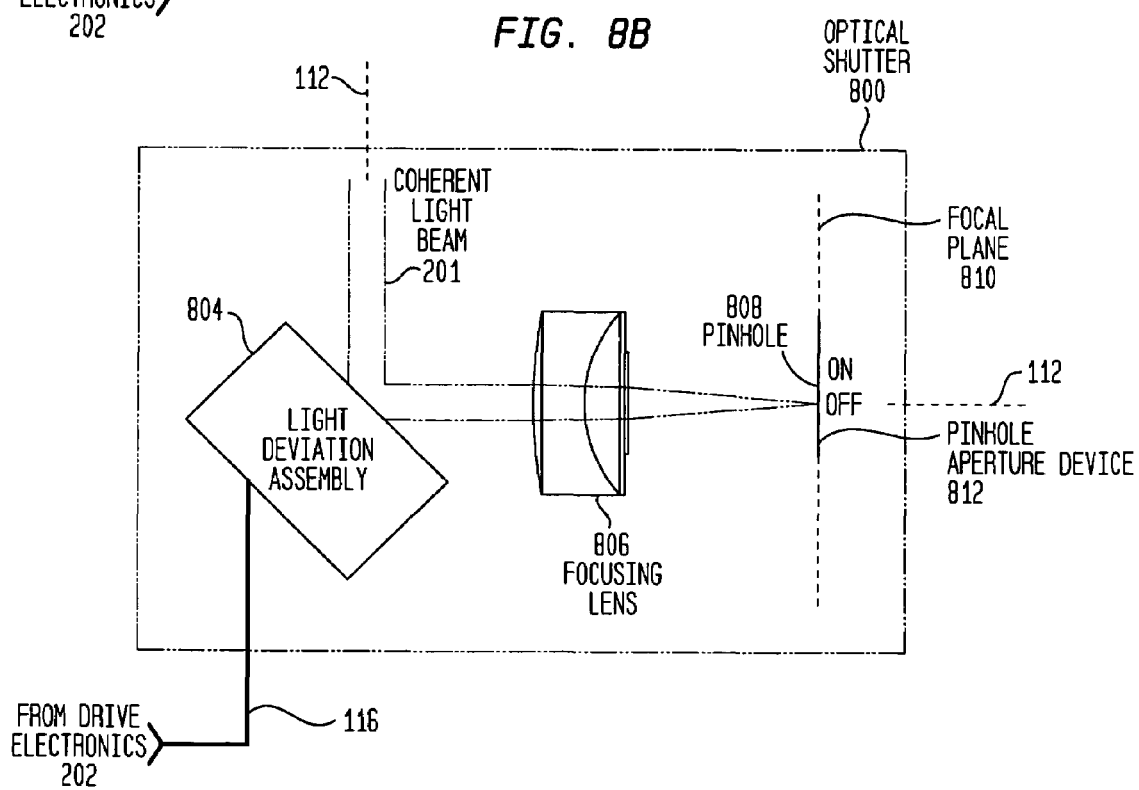

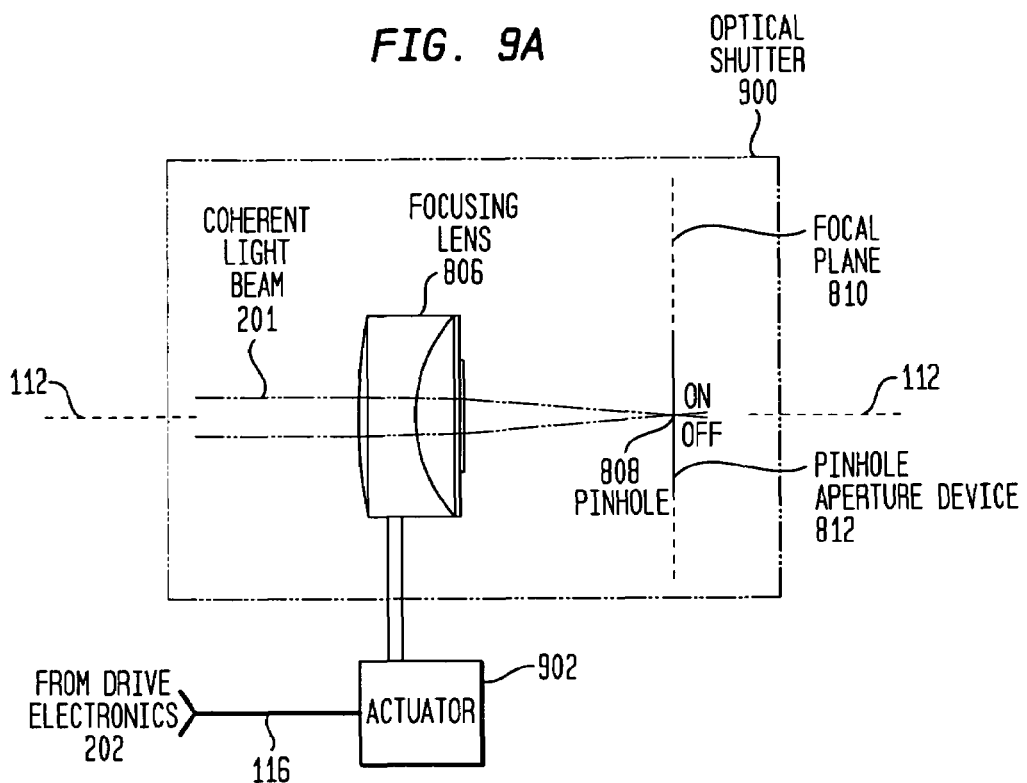
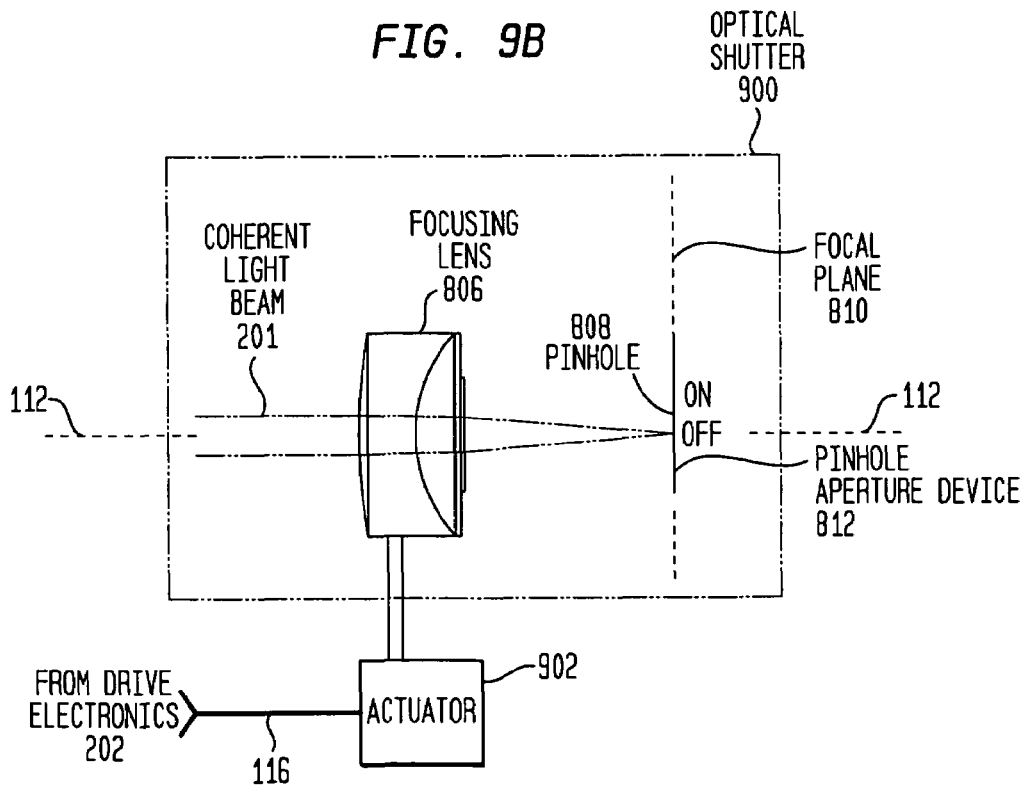

OPERATIONAL MODE PERFORMANCE OF A HOLOGRAPHIC MEMORY SYSTEM

CROSS-REFERENCE TO RELATED APPLICATIONS

This application makes reference to and claims the benefit of the following U.S. Provisional Patent Application No. 60/684,531 filed May 26, 2005. The entire disclosure and contents of the foregoing Provisional Application is hereby incorporated by reference. This application also makes reference to the following U.S. patent applications. The first application is U.S. application Ser. No. 11/440,370, entitled "Illuminative Treatment of Holographic Media," filed May 25, 2006. The second application is U.S. application Ser. No. 11/440,446, entitled "Methods and Systems for Laser Mode Stabilization," filed May 25, 2006. The third application is U.S. application Ser. No. 11/440,447, entitled "Phase Conjugate Reconstruction of Hologram," filed May 25, 2006. The fourth application is U.S. application Ser. No. 11/440,359, entitled "Holographic Drive Head and Component Alignment," filed May 25, 2006. The fifth application is U.S. application Ser. No. 11/440,358, entitled "Optical Delay Line in Holographic Drive," filed May 25, 2006. The sixth application is U.S. application Ser. No. 11/440,357, entitled "Controlling the Transmission Amplitude Profile of a Coherent Light Beam in a Holographic Memory System," filed May 25, 2006. The seventh application is U.S. application Ser. No. 11/440,372, entitled "Sensing Absolute Position of an Encoded Object," filed May 25, 2006. The eighth application is U.S. application Ser. No. 11/440,371, entitled "Sensing Potential Problems in a Holographic Memory System," filed May 25, 2006. The ninth application is U.S. application Ser. No. 11/440,367, entitled "Post-Curing of Holographic Media," filed May 25, 2006. The tenth application is U.S. application Ser. No. 11/440,366, entitled "Erasing Holographic Media," filed May 25, 2006. The eleventh application is U.S. application Ser. No. 11/440,365, entitled "Laser Mode Stabilization Using an Etalon," filed May 25, 2006. The twelfth application is U.S. application Ser. No. 11/440,369, entitled "Holographic Drive Head Alignments," filed May 25, 2006. The thirteenth application is U.S. application Ser. No. 11/440,368, entitled "Replacement and Alignment of Laser," filed May 25, 2006. The entire disclosure and contents of the foregoing U.S. patent applications are hereby incorporated by reference.

BACKGROUND

1. Field of the Invention

The present invention relates generally to holographic memory systems, and more particularly, to improved operational mode performance of a holographic memory system.

2. Related Art

Developers of information storage devices continue to seek increased storage capacity. As part of this development, memory systems employing holographic optical techniques, referred to as holographic memory systems, have been suggested as alternatives to conventional memory devices.

Typically, holographic memory systems read/write data to/from a photosensitive storage medium. Such systems typically access holographic representations (that is, holograms) substantially throughout the spatial extent of the storage medium. This allows holographic systems to advantageously store a large amount of data.

Holographic memory systems may be designed to record data as single bits of information (i.e., bit-wise data storage). See McLeod et al. "Micro-Holographic Multi-Layer Optical Disk Data Storage," *International Symposium on Optical Memory and Optical Data Storage* (July 2005). Holographic memory systems may also be designed to record an array of data that may be a 1-dimensional linear array (i.e., a 1×N array, where N is the number linear data bits), or a 2-dimension array commonly referred to as a "page-wise" memory system. Page-wise memory systems may involve the storage and readout of an entire two-dimensional representation, e.g., a page of data.

Holographic systems typically involve the three-dimensional storage of holograms as a pattern of varying refractive index and/or absorption imprinted into the storage medium. In general, holographic systems operate to perform a data write (also referred to as a data record or data store operation, simply "write" operation herein) by combining two coherent light beams, such as laser beams, at a particular point within the storage medium. Specifically, a data-encoded light beam is combined with a reference light beam to create an interference pattern in the photosensitive storage medium. The interference pattern induces material alterations in the storage medium to form a hologram. The formation of the hologram is a function of the relative amplitudes, phase, coherence, and polarization states of the data-encoded and reference light beams. It is also dependent on the relative wavelength of the incident beams as well as the three dimensional geometry at which the data-encoded and reference light beams are projected into the storage medium.

Holographically-stored data is retrieved from the holographic memory system by performing a read (or reconstruction) of the stored data. The read operation is performed by projecting a reconstruction or probe beam into the storage medium at the same angle, wavelength, phase and position as the reference beam used to record the data, or compensated equivalents thereof. The hologram and the reconstruction beam interact to reconstruct the data beam. The reconstructed data beam is then detected by a sensor, such as a photodetector, sensor array, camera, etc. The reconstructed data is then processed for delivery to an output device.

As noted, holographic systems are light sensitive systems that have the ability to store large amounts of data. In fact, it is possible for each page stored as a hologram to contain thousands or even millions of elements. Theoretically, it is believed that, at the present time, up to $10^{14}$ bits of information are storable in approximately 1.0 $cm^3$ of photosensitive storage medium. Accordingly, with such large storage capacity in these systems it is desirable to quickly access the holographic storage medium.

SUMMARY

In one aspect of the invention, a holographic memory system is disclosed. The holographic memory system comprises a photosensitive storage medium configured to holographically store information; a source of a coherent light beam; and an optical steering subsystem for directing the coherent light beam to the storage medium, comprising: a variable optical divider configured to dynamically redirect the coherent light beam into one or more discrete light beams and to dynamically allocate power of the coherent light beam among the one or more discrete light beams.

In another aspect of the invention, a method of operating a holographic memory system having a photosensitive storage medium configured to holographically store information is disclosed. The method comprising: generating a coherent light beam; redirecting the coherent light beam into one or more discrete light beams; and dynamically allocating power of the coherent light beam among the discrete light beams; and directing the one or more discrete light beams to the photosensitive storage medium.

In another aspect of the invention a holographic memory system is disclosed. The holographic memory system comprises a means for holographically storing information; a means of providing a coherent light beam; and an optical steering means for directing the coherent light beam to a photosensitive storage medium, comprising: a variable optical divider means for dynamically redirecting the coherent light beam into one or more discrete light beams and for dynamically allocating power of the coherent light beam among the discrete light beams.

In another aspect of the invention a holographic memory system is disclosed. The holographic memory system comprises a photosensitive storage medium configured to holographically store information; at least one source of coherent light; and an optical steering subsystem comprising: an optical shutter configured to regulate the coherent light comprising: a focusing lens configured to focus the coherent light; a pinhole positioned at the focal plane of the focusing lens; and a light deviation assembly configured to control the angle of the coherent light directed towards the focusing lens.

In another aspect of the invention a holographic memory system is disclosed. The holographic memory system comprises a photosensitive storage medium configured to holographically store information; at least one source of coherent light; and an optical steering subsystem comprising: an optical shutter configure to regulate the coherent light comprising: a focusing lens configured to focus the coherent light; a pinhole positioned at the focal plane of the focusing lens; and an actuator coupled to the focusing lens configured to control the position of the focusing lens relative to the path of the coherent light.

In another aspect of the invention a holographic memory system is disclosed. The holographic memory system comprises a photosensitive storage medium configured to holographically store information; at least one source of coherent light; and an optical steering subsystem comprising: an optical shutter configure to regulate the coherent light comprising: a focusing lens configured to focus the coherent light; a pinhole positioned at the focal plane of the focusing lens; a beam block; and an actuator coupled to the beam block configured to control the position of the beam block relative to the path of the coherent light.

BRIEF DESCRIPTION OF THE DRAWINGS

Embodiments of the present invention will be described in conjunction with the accompanying drawings, in which:

FIG. 5A is a schematic block diagram of a further embodiment of the variable optical divider illustrated in FIGS. 2A and 2B when the holographic memory system is in the write operational mode as illustrated in FIG. 2A;

FIG. 5B is a schematic block diagram of the embodiment of the variable optical divider illustrated in FIG. 5A when the holographic memory system is in the read operational mode as illustrated in FIG. 2B;

FIG. 6A is a schematic block diagram of one embodiment of the variable optical divider illustrated in FIGS. 2A and 2B when the holographic memory system is in the write operational mode as illustrated in FIG. 2A;

FIG. 6B is a schematic block diagram of the embodiment of the variable optical divider illustrated in FIG. 6A when the holographic memory system is in the read operational mode as illustrated in FIG. 2B;

FIG. 7A is a schematic block diagram of one embodiment of the variable optical divider illustrated in FIGS. 2A and 2B when the holographic memory system is in the write operational mode;

FIG. 7B is a schematic block diagram of the embodiment of the variable optical divider illustrated in FIG. 7A when the holographic memory system is in the read operational mode as illustrated in FIG. 2B;

FIG. 8A is a schematic block diagram of one embodiment of the optical shutter illustrated in FIGS. 2A and 2B, arranged so as to permit passage of coherent light;

FIG. 8B is a schematic block diagram of one embodiment of the optical shutter illustrated in FIGS. 2A and 2B, arranged so as to block the passage of coherent light.

FIG. 9A is a schematic block diagram of one embodiment of the optical shutter illustrated in FIGS. 2A and 2B, arranged so as to permit passage of coherent light;

FIG. 9B is a schematic block diagram of one embodiment of the optical shutter illustrated in FIGS. 2A and 2B, arranged so as to block the passage of coherent light.

DETAILED DESCRIPTION

Aspects of the present invention are generally directed to allocating power of a coherent light beam among one or more discrete light beams used in a holographic memory system. Specifically, a variable optical divider is incorporated into an optical steering subsystem of a holographic memory system to dynamically redirect the coherent light beam into one or more discrete light beams, and to dynamically allocate power of the coherent light beam among the discrete light beams. This enables the holographic memory system to allocate power among the one or more discrete light beams to optimize write and/or read access of the holographic storage medium.

Figure 1:
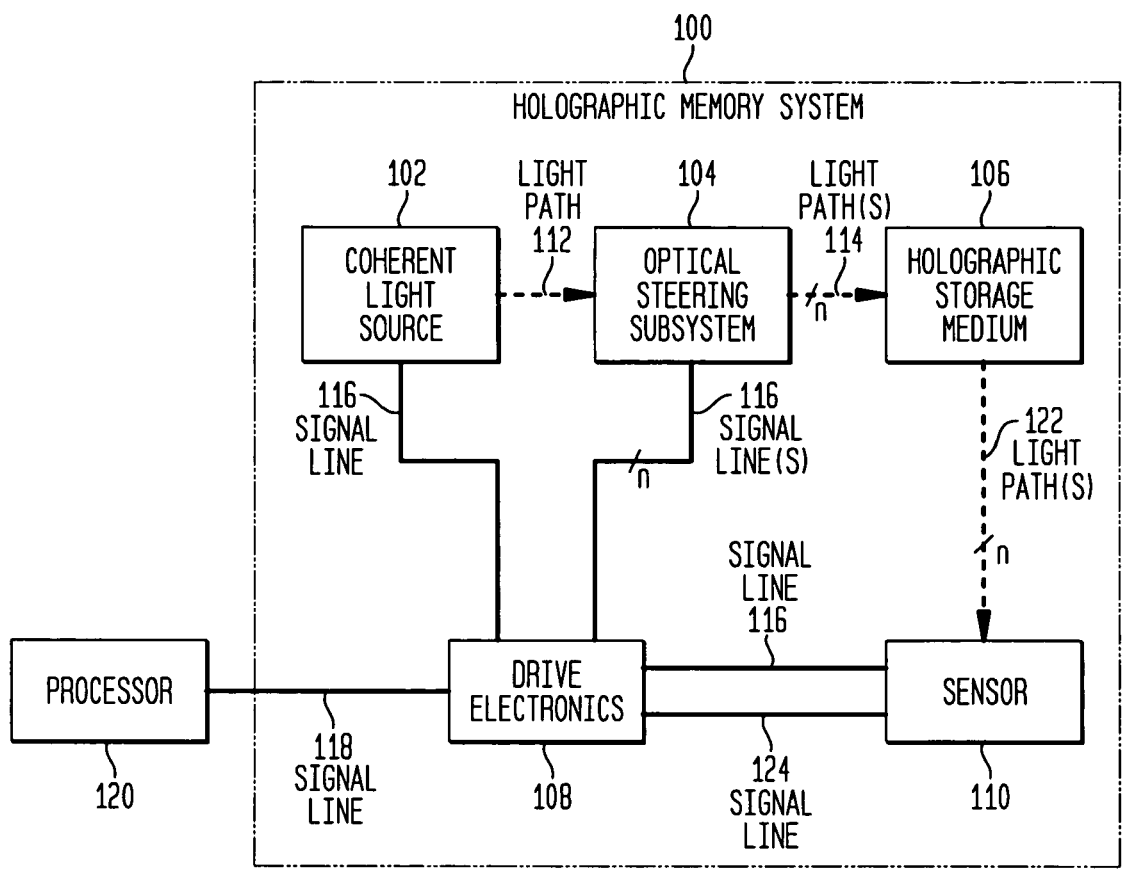
FIG. 1 is schematic block diagram of an exemplary holographic memory system in which embodiments of the present invention may be advantageously implemented.

As noted, embodiments of the present invention may be used in holographic memory systems; that is, data storage and retrieval systems that implement holographic optical techniques. FIG. 1 is a block diagram of an exemplary holographic memory system in which embodiments of the present invention may be advantageously implemented. It should be appreciated that although embodiments of the present invention will be described in the context of the exemplary holographic memory system shown in FIG. 1, the present invention may be implemented in connection with any system now or later developed that implement holographic optical techniques.

Holographic memory system 100 receives along signal line 118 signals transmitted by an external processor 120 to read and write date to a photosensitive holographic storage medium 106. As shown in FIG. 1, processor 120 communicates with drive electronics 108 of holographic memory system 100. Processor 120 transmits signals based on the desired mode of operation of holographic system 100. For ease of description, the present invention will be described with reference to read and write operational modes of a holographic memory system. It should be apparent to one of ordinary skill in the art, however, that the present invention applies to other operational modes of a holographic memory system, such as Pre-Cure, Post-Cure, Write Verify, or any other operational mode implemented now or in the future in a holographic memory system.

Using control and data information from processor 120, drive electronics 108 transmit signals along signal lines 116 to various components of holographic memory system 100. One such component that receives signals from drive electronics 108 is coherent light source 102. Coherent light source 102 may be any light source now or later developed that generates a coherent light beam. In one embodiment of the invention, coherent light source 102 is a laser.

The coherent light beam from coherent light source 102 is directed along light path 112 into an optical steering subsystem 104. Optical steering subsystem 104 directs one or more coherent light beams along one or more light paths 114 to holographic storage medium 106. In the write operational mode described further below, at least two coherent light beams are transmitted along two light paths 114 to create an interference pattern in holographic storage medium 106. The interference pattern induces material alterations in storage medium 106 to form a hologram, as described in further detail below.

In the read operational mode, holographically-stored data is retrieved from holographic storage medium 106 by projecting a reconstruction or probe beam along one light path 114 into storage medium 106. The hologram and the reconstruction beam interact to reconstruct the data beam which is transmitted along light path 122. The reconstructed data beam is detected by a sensor 110. It would be apparent to one of ordinary skill in the art that sensor 110 could be any type of detector used in the art. In one embodiment, sensor 110 is a camera. In another embodiment, sensor 110 is a photodetector.

The light detected at sensor 110 is converted to a signal and transmitted to drive electronics 108 via signal line 124. Processor 120 then receives the requested data and/or related information from drive electronics 108 via signal line 118.

Figure 2A:
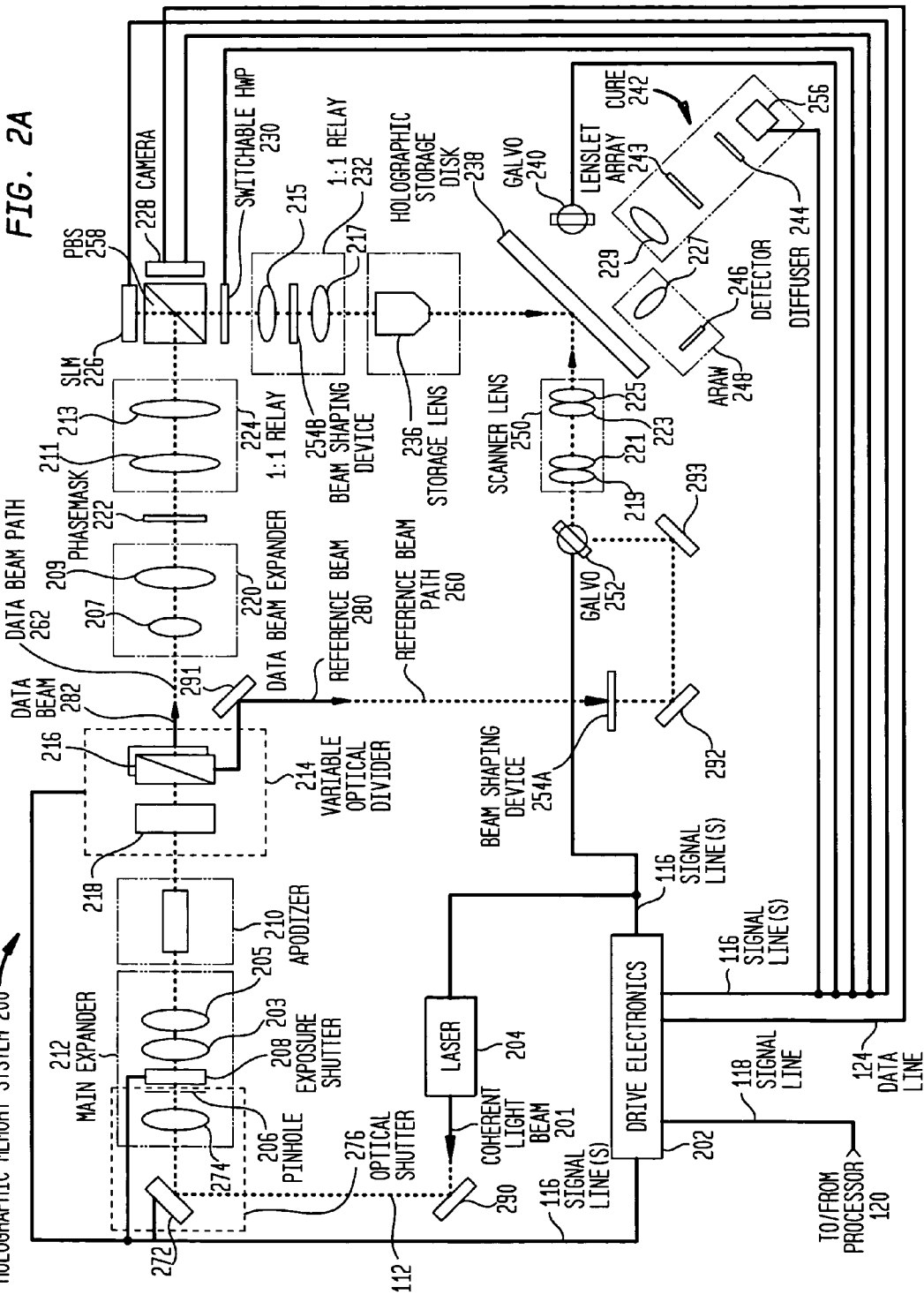
FIG. 2A is an architectural block diagram of the components of a holographic memory system illustrating the optical paths utilized during write operations in accordance with one embodiment of the present invention.
Figure 2B:
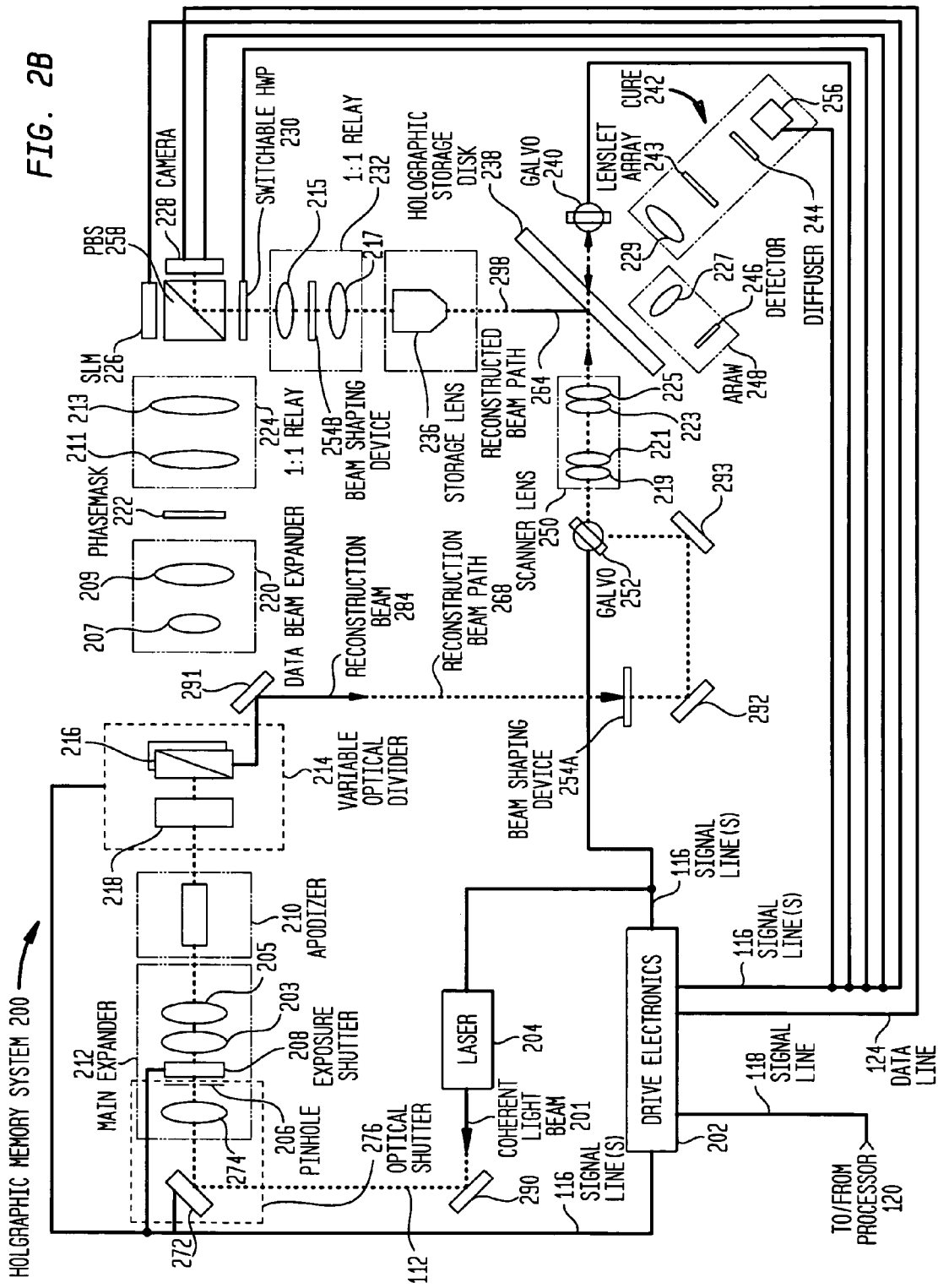
FIG. 2B is an architectural block diagram of the components of a holographic memory system illustrating the optical paths utilized during read operations in accordance with one embodiment of the present invention.

A more detailed description of the components of an exemplary embodiment of holographic memory system 100 is presented next below with reference to FIGS. 2A and 2B. This embodiment of holographic memory system 100 is referred to herein as holographic memory system 200. FIGS. 2A and 2B are similar schematic block diagrams of the components of one embodiment of holographic memory system 200 illustrating the optical paths utilized during write and read operational modes, respectively, of the holographic system.

Referring to the write operational mode configuration illustrated in FIG. 2A, coherent light source 102 (FIG. 1) is a laser 204. Laser 204 receives via signal line 116 (FIG. 1) control signals from an embodiment of drive electronics 108 (FIG. 1), referred to as drive electronics 202. In the illustrated write mode configuration, such a control signal causes laser 204 to generate a coherent light beam 201 which is directed along light path 112, introduced above with reference to FIG. 1.

Coherent light beam 201 from laser 204 is reflected by mirror 290 and is directed through optical shutter 276. Optical shutter 276 comprises beam deviation assembly 272, focusing lens 274 and pinhole 206 that are collectively operable to shutter coherent light beam 201 from entering the remainder of optical steering subsystem 104. This is described in further detail below.

Coherent light beam 201 passing through optical shutter 276 enters main expander assembly 212. Main expander 212 includes lenses 203 and 205 to expand the light beam to a fixed diameter. Main expander 212 also includes lens 274 and pinhole 206 to spatially filter the light beam. An exposure shutter 208 within main expander assembly 212 is an electromechanical device that controls recording exposure times. As shown in FIG. 2A, the exemplary embodiment of optical shutter 276 utilizes components of main expander 212, namely, pinhole 206 and focusing lens 274.

Upon exiting main expander assembly 212, coherent light beam 201 is directed through an apodizer 210. As is well-known in the art, light emitted from a laser such as laser 204 generally has a spatially varying distribution of light. Apodizer 210 converts this spatially varying intensity beam 201 from laser 204 into a more uniform beam with controlled edge profiles.

After passing through apodizer 210, coherent light beam 201 enters variable optical divider 214. Variable optical divider 214 uses a dynamically-controlled polarization device 218 and at least one polarizing beam splitter (PBS) 216 to redirect coherent light beam 201 into one or more discrete light beams transmitted along two light paths 114 (FIG. 1): light path 260 and light path 262. Variable optical divider 214 dynamically allocates the power of coherent light beam 201 among these discrete light beams 280, 282. In the write operational mode shown in FIG. 2A, the discrete light beam directed along light path 260 is the noted reference light beam, referred to herein as reference beam 280, while the discrete light beam directed along light path 262 is the noted data light beam, referred to as data beam 282.

Upon exiting variable optical divider 214, reference beam 280 is reflected by mirror 291 and directed through beam-shaping device 254A positioned in reference path 260. After passing through beam shaping device 254A, reference beam 280 is reflected by mirrors 292 and 293 towards galvo mirror 252. Galvo mirror 252 reflects reference beam 280 into scanner lens assembly 250. Scanner lens assembly 250 has lenses 219, 221, 223 and 225 to pivotally direct reference beam 280 at holographic storage media 106, shown as holographic storage disk 238 in FIGS. 2A and 2B.

Returning attention to variable optical divider 214, data light beam 282 exits the variable optical divider and passes through data beam expander lens assembly 220. Data beam expander 220 implements lenses 207 and 209 to magnify data beam 282 to a diameter suitable for illuminating Spatial Light Modulator (SLM) 226, located further along data beam path 262. Data beam 282 then passes through phasemask 222 to improve the uniformity of the Fourier transform intensity distribution. Data beam 282 illumination of phasemask 222 is then imaged onto SLM 226 via 1:1 relay 224 having lenses 211 and 213. PBS 258 directs data beam 282 onto SLM 226.

SLM 226 modulates data beam 282 to encode information into the data beam. SLM 226 receives the encoding information from drive electronics 202 via a signal line 116. Modulated data beam 282 is reflected from SLM 226 and passes through PBS 258 to a switchable half-wave plate 230. Switchable half-wave plate 230 is used to optionally rotate the polarization of data beam 282 by 90 degrees. A 1:1 relay 232 containing beam-shaping device 254B and lenses 215 and 217 directs data beam 282 to storage lens 236 which produces a filtered Fourier transform of the SLM data inside holographic storage disk 238.

At a particular point within holographic storage disk 238, reference beam 280 and data beam 282 create an interference pattern to record a hologram in holographic storage disk 238.

Holographic memory system 100 further comprises an illuminative curing subsystem 242. Illuminative curing subsystem 242 is configured to provide a uniform curing light beam with reduced coherence to holographic storage disk 238 to pre-cure and/or post-cure a region of the storage medium. Illuminative curing subsystem 242 comprises a laser 256 sequentially aligned with a diffuser 244, a lenslet array 243 and a lens 229. Laser 256 provides a high intensity illuminative curing light beam that is incident on storage disk 238. The light from laser 256 is processed by diffuser 244, lenslet array 243, and lens 229 prior to reaching holographic storage disk 238.

Holographic memory system 100 additionally comprises an associative read after write (ARAW) subsystem 248. ARAW subsystem 248 is configured to partially verify a hologram soon after the hologram is written to holographic storage disk 238. ARAW subsystem comprises a lens 227 and a detector 246. Holographic system 100 uses ARAW subsystem 248 by illuminating a written hologram with an all-white data page. When a hologram is illuminated by this all-white data page, ARAW subsystem 248 detects the reconstructed reference beam resulting from this all-white illumination. Specifically, detector 246 examines the reconstructed reference beam to verify that the hologram has been recorded correctly.

Referring to the read mode configuration illustrated in FIG. 2B, laser 204 generates coherent light beam 201 in response to control signals received from drive electronics 202. As noted above, coherent light 201 is reflected by mirror 290 through optical shutter 276 that shutters coherent light beam 201 from entering the remainder of optical steering subsystem 104. Coherent light beam 201 thereafter enters main expander assembly 212. Main Expander includes lenses 203 and 205 to expand the light beam to a fixed diameter, and lens 274 and pinhole 206 which spatially filter the light beam, as described above with reference to FIG. 2A. Upon exiting main expander assembly 212, coherent light 201 is directed through apodizer 210 to convert the spatially varying intensity beam into a more uniform beam.

In the arrangement of FIG. 2B, when coherent light beam 201 enters variable optical divider 214, dynamically-controlled polarization device 218 and PBS 216 collectively redirect the coherent light beam into one discrete light beam 114, referred to as reconstruction beam 284. Reconstruction data beam 284 travels along reconstruction beam path 268, which is the same path 260 traveled by reference beam 280 during the write mode of operation, described above with reference to FIG. 2A.

A desired portion of the power of coherent light beam 201 is allocated to this single discrete light beam based on the selected polarization implemented in device 218. As will be described in detail below, in certain embodiments, all of the power of coherent light beam 201 is allocated to reconstruction light beam 284 to maximize the speed at which data may be read from holographic medium 238.

Upon exiting variable optical divider 214, reconstruction beam 284 is directed by mirror 291 through beam-shaping device 254A. As noted, beam-shaping device 254A is described further below.

After passing through beam-shaping device 254A, reconstruction beam 284 is directed to scanner lens 250 by mirrors 292 and 293, and galvo mirror 252. Scanner lens assembly 250 pivots reconstruction beam 284 at a desired angle toward holographic storage disk 238.

During the read mode, reconstruction beam 284 passes through holographic storage disk 238 and is retro-reflected back through the medium by a galvo mirror 240. As shown in FIG. 2B, the data reconstructed on this second pass through storage disk 238 is directed along reconstructed data beam path 298 as reconstructed data beam 264.

Reconstructed data beam 284 passes through storage lens 236 and 1:1 relay 232 to switchable half wave plate 230. Switchable half wave plate 230 is controlled by drive electronics 202 so as to have a negligible polarization effect. Reconstructed data beam 264 then travels through switchable half wave plate 230 to PBS 258, all of which are described above with reference to FIG. 2A. PBS 258 reflects reconstructed data beam 264 to an embodiment of sensor 110 (FIG. 1), here a camera 228. The light detected by camera 228 is converted to a signal and transmitted to drive electronics 202 via signal line 124, introduced above with reference to FIG. 1. Processor 120 then receives the requested data and/or related information from drive electronics 202 via signal line 118.

Figure 3A:
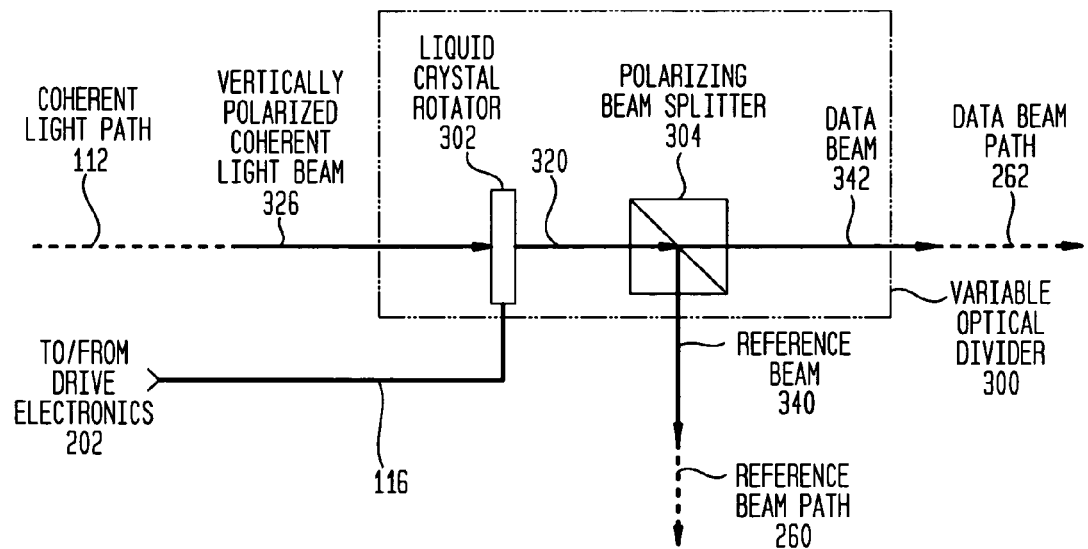
FIG. 3A is a schematic block diagram of one embodiment of the variable optical divider illustrated in FIGS. 2A and 2B when the holographic memory system is in the write operational mode as illustrated in FIG. 2A.
Figure 3B:
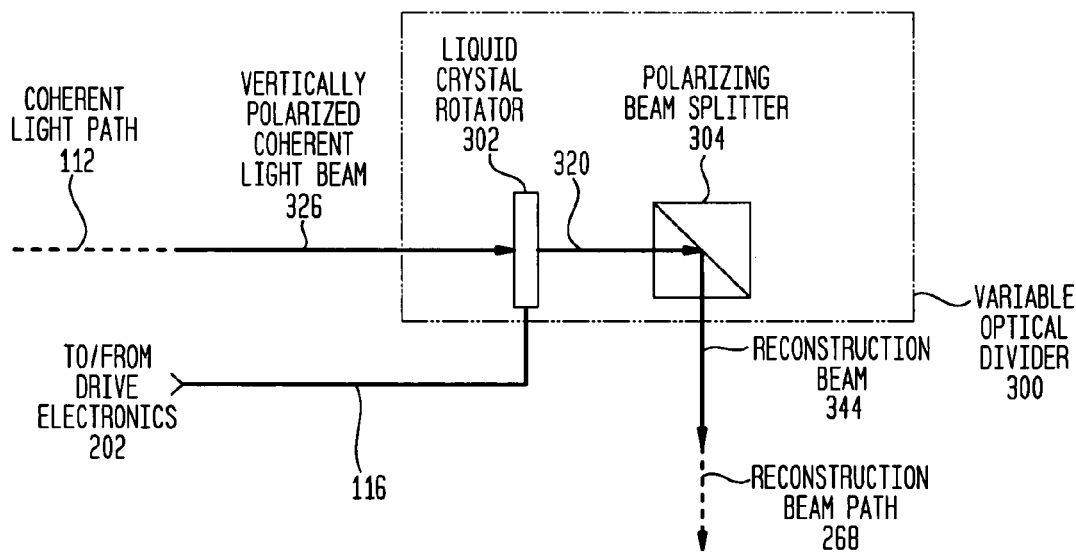
FIG. 3B is a schematic block diagram of the embodiment of the variable optical divider illustrated in FIG. 3A when the holographic memory system is in the read operational mode as illustrated in FIG. 2B.

Specific embodiments of variable optical divider 214 will now be described in more detail with reference to FIGS. 3A through 7B. In the embodiment shown in FIGS. 3A and 3B, variable optical divider 214 is referred to as variable optical divider 300. Variable optical divider 300 comprises a Liquid Crystal Rotator (LCR) 302 and a polarizing beam splitter (PBS) 304 sequentially aligned in coherent light path 112 (FIG. 1), as shown in FIGS. 3A and 3B.

Throughout this application, the term polarizing beam splitter (PBS) refers to any device configured to direct an incident light beam in a direction based on the polarization of the incident light beam. For example, embodiments of a PBS used in accordance with the present invention may be a polarizing beam splitter cube, a thin film polarizer, a plate polarizer, a prism made of certain materials such as calcite, a customized prism, and other devices now or later developed.

Returning to FIGS. 3A and 3B, LCR 302 is a dynamically-controlled wave plate that provides tunable rotation of the polarization of exemplary coherent light beam 201 (FIGS. 2A and 2B), referred to herein as coherent light beam 326. In the embodiment illustrated in FIGS. 3A and 3B, linearly polarized coherent light beam 201 generated by laser 204 is, after preliminary processing described above with reference to FIG. 2A, a vertically polarized light beam 326. In this embodiment, LCR 302 may rotate the polarization of coherent light beam 326 by an amount between 0 and 90 degrees.

It would be appreciated by one of ordinary skill in the art that in other embodiments and applications, LCRs of the present invention may rotate the polarization of an incident coherent light beam between 0 and 360 degrees. Illustrated embodiments of LCRs configured to rotate an incident coherent light beam between 0 and 90 degrees are shown as examples only, and do not limit aspects of the present invention.

LCR 302 adjusts the amount of polarization rotation based on a voltage applied to LCR 302. This voltage is determined by a voltage control signal provided by drive electronics 202 via control signal line 116. The resulting polarization of coherent light beam 320 emanating from LCR 302 determines the distribution of the power of the light beam across one or more discrete light beams.

In one embodiment, for example, drive electronics 202 controls LCR 302 based on the operational mode of holographic memory system 100. When holographic memory system 100 is in the write operational mode, LCR 302 is set to rotate the polarization of vertically-polarized coherent light beam 326 by a predetermined amount of, for example, approximately 45 degrees. When holographic memory system 100 is in the read operational mode, LCR 302 is set to rotate the polarization of vertically-polarized coherent light beam 326 by a predetermined amount of, for example, approximately 0 degrees.

Light beam 320 leaving LCR 302 impinges on PBS 304 and is divided by PBS 304 into two discrete light beams. As noted above with reference to FIG. 2A, one light beam, data light beam 282, is transmitted along data beam path 262 while the other light beam, reference light beam 280, is transmitted along reference beam path 260. In this exemplary embodiment, data light beam 282 is referred to herein as data beam 342, while reference light beam 280 is referred to herein as reference beam 340.

The intensity of light beams 340, 342 transmitted along optical path 260, 262, respectively, depends on the polarization rotation provided by LCR 302. Specifically, PBS 304 divides the intensity of light beam 326 based on the polarization of coherent light beam 326 provided by LCR 302. In the example of LCR 302 rotating the polarization of vertically-polarized coherent light beam 326 by 45 degrees, PBS 304 allocates the power of coherent light beam 320 approximately equally among the two discrete light beams 340, 342. It should be appreciated that LCR 302 may rotate the polarization of coherent light beam 320 by any other desired angle, and is not limited to a rotation of 45 degrees.

In the read mode embodiment illustrated in FIG. 3B, vertically-polarized light beam 326 impinges on LCR 302. The voltage across LCR 302 is adjusted such that the polarization of light beam 326 is substantially unaffected by LCR 302. Thus, in the read mode, light beam 326 undergoes no rotation of its polarization. Light beam 320 leaving LCR 302 then, is a vertically-polarized coherent light beam. Coherent light beam 320 then impinges on PBS 304 and is largely directed along reconstruction beam path 268, introduced above with reference to FIG. 2B. As described above with reference to FIG. 2B, this light beam is used to reconstruct the data stored in holographic storage disk 238 and, as such, is referred to herein as reconstruction beam 284. In the example illustrated in FIG. 3B, reconstruction beam 284 is referred to as reconstruction light beam 344.

An alternative embodiment of variable optical divider 214 is described next below with reference to FIGS. 4A and 4B. In the embodiment of variable optical divider 214 shown in FIGS. 4A and 4B, variable optical divider 214 is referred to as variable optical divider 400.

Figure 4A:
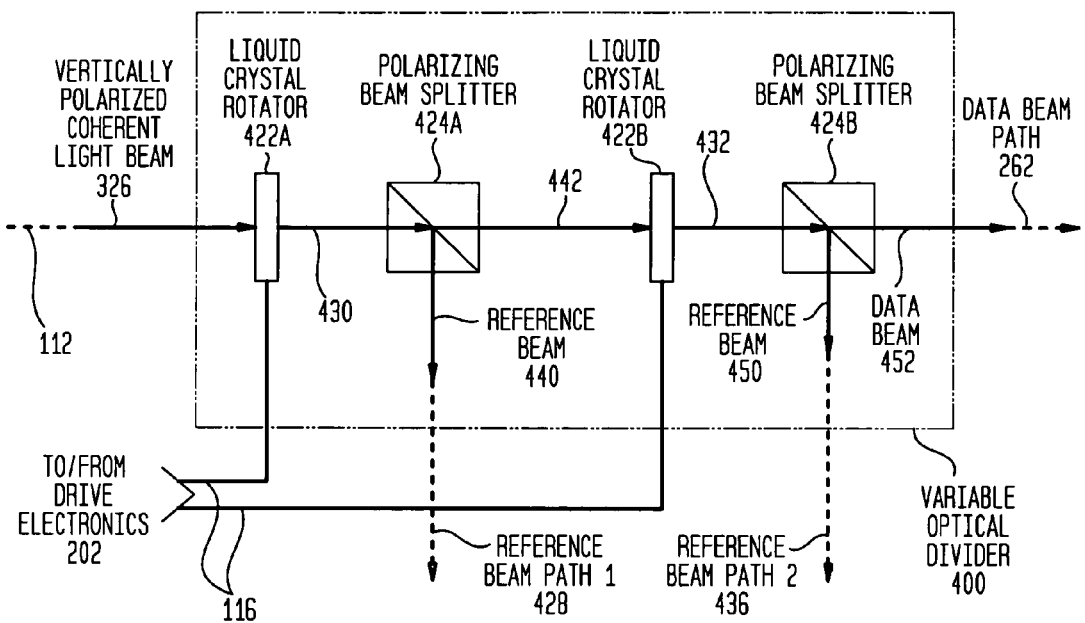
FIG. 4A is a schematic block diagram of another embodiment of the variable optical divider illustrated in FIGS. 2A and 2B when the holographic memory system is in the write operational mode as illustrated in FIG. 2A.
Figure 4B:
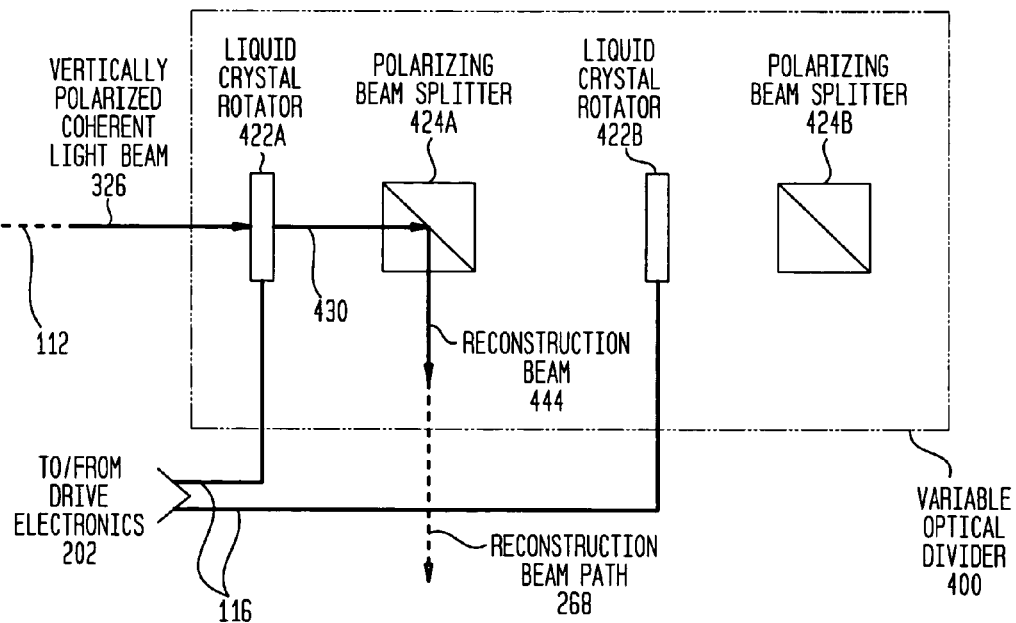
FIG. 4B is a schematic block diagram of the embodiment of the variable optical divider illustrated in FIG. 4A when the holographic memory system is in the read operational mode as illustrated in FIG. 2B.

Variable optical divider 400 comprises two Liquid Crystal Rotators (LCRs) 422A and 422B and two polarizing beam splitters (PBSs) 424A and 424B sequentially aligned in coherent light path 112 as shown in FIGS. 4A and 4B. Thus, in this embodiment, dynamically-controlled polarization device 218 (FIGS. 2A, 2B) comprises two LCRs, LCR 422A and LCR 422B, and PBS 216 (FIGS. 2A, 2B) comprises two PBSs, PBS 424A and PBS 424B.

As in the embodiment described above with reference to FIGS. 3A and 3B, coherent light beam 201 generated by laser 204 is a vertically-polarized light beam 326. LCRs 422 are the same or different embodiments of a dynamically-controlled wave plate described above with reference to FIGS. 3A and 3B that provides tunable polarization control of an incident coherent light beam. LCRs 422A, 422B adjust the angle of polarization of coherent light beams 326 and 442, respectively, by a controlled amount of between approximately 0 and 90 degrees.

As described above with reference to FIGS. 3A and 3B, LCRs 422 adjust the angle of polarization based on a voltage applied to each LCR respectively. In this embodiment, this control voltage is determined by a voltage control signal provided by drive electronics 202 via control signal lines 116. In one embodiment, drive electronics 202 controls LCRs 422 based on the operational mode of holographic memory system 100, as described above.

PBSs 424 are the same or different embodiments of a PBS described above with reference to FIGS. 2A through 3B. PBSs 424A, 424B each divide the intensity of an impinging coherent light beam into one or more discrete light beams based on the polarization of the impinging coherent light beam. For example, as shown in FIGS. 4A and 4B, PBS 424A divides the intensity of coherent light beam 430 based on the polarization of coherent light beam 430, while PBS 424B divides the intensity of coherent light beam 432 based on the polarization of that light beam 432. As described above, the polarization of coherent light beam 430 incident on PBS 424A is based upon the operation of LCR 422A.

FIG. 4A illustrates variable optical divider 400 when holographic memory system 100 is the write operational mode. In one embodiment, the voltage applied to LCR 422A is set to rotate the polarization of coherent light beam 430 by a predetermined amount of approximately 45 degrees. As a result, polarized coherent light beam 430 leaving LCR 422 is rotated 45 degrees. It should be appreciated that LCR 422 may rotate the polarization of coherent light beam 430 by any other desired angle and is not limited to rotation of 45 degrees.

Coherent light beam 430 leaving LCR 422A impinges on PBS 424A and is divided by PBS 424A into two discrete light beams. One light beam is transmitted along data beam path 262, and is referred to herein as coherent light beam 442. The other light beam is transmitted along a first reference beam path 428, and is referred to herein as reference beam 440. As noted above, the power of coherent light beam 420 is allocated among coherent light beam 442 and reference beam 440 based on the polarization of coherent light beam 430. In the above example in which coherent light beam 430 is rotated by 45 degrees from the vertical, the division of the power of coherent light beam 430 is approximately equally divided among reference beam 440 directed along first reference beam path 428 and coherent light beam 442 directed along data beam path 262. Thus, in the arrangement shown, reference beam 440 is a vertically polarized light beam having half the power of coherent light beam 430 while coherent light beam 442 is a horizontally polarized light beam having half the power of coherent light beam 430. It should be appreciated that LCR 422A may rotate the polarization of coherent light beam 430 by any other desired angle and is not limited to rotation of 45 degrees.

In one embodiment of the arrangement shown in FIG. 4A, following the division of polarized coherent light beam 430 by PBS 424, coherent light beam 442 impinges on LCR 424B. As noted, LCR 424B adjusts the amount of polarization rotation of coherent light beam 442 based on a voltage control signal provided by drive electronics 202 via control signal line 116.

Polarized coherent light beam 432 impinges on PBS 424B and is divided by PBS 424B into two discrete light beams. One light beam, data beam 452, is transmitted along data beam path 262 (FIG. 2A), while the other light beam, reference beam 450, is transmitted along a second reference beam path 436. PBS 424B allocates the power of coherent light beam 432 based on the polarization of light beam 432. In one embodiment of the write operational mode illustrated in FIG. 4A, coherent light beam 432 is rotated by approximately 45 degrees. This 45 degree polarization results in the approximately equally allocation of the power of light beam 432 among reference beam 450 and data beam 452. It should be appreciated that LCR 424B may rotate the polarization of coherent light beam 430 by any other desired angle and is not limited to rotation of 45 degrees.

As one of ordinary skill in the art will appreciate, in certain applications of holographic memory system 200, two coherent light beams are generated during write operations. As such, embodiments of variable optical divider 400 utilized in such systems will rotate the polarization of vertically-polarized light beam 326 by approximately 90 degrees. As such, PBS 424A transmits substantially all of light beam 326A, and does no reflect substantially any of light beam 326A along light beam path 428. Thus, such embodiments of variable optical divider 400 will generate two coherent light beams under such circumstances: data beam 252 and reference beam 450.

FIG. 4B illustrates variable optical divider 400 when holographic memory system 100 is the read operational mode. In one embodiment, LCR 422A is controlled to rotate the polarization of coherent light beam 430 by a predetermined amount of approximately 0 degrees. Thus, in the read mode, vertically-polarized light beam 326 undergoes no rotation of its polarization, and a single beam, reconstruction beam 444 having substantially the same power as coherent light beam 430, is emitted from PBS 424. Approximately no light is transmitted along the remaining portion of coherent beam path 112, as shown in FIG. 4B. As a result, approximately no light impinges on LCR 422B and PBS 424B. It follows then, that in the read operational mode, variable optical divider 400 emits no data beam, as described above with reference to FIG. 2B.

It would be apparent to one of ordinary skill in the art that in alternative embodiments additional LCRs 422 and associated PBSs 424 may be implemented in a variable optical divider to create additional discrete light beams.

Another embodiment of variable optical divider 214 is described next below with reference to FIGS. 5A and 5B. This embodiment of variable optical divider 214 is referred to herein as variable optical divider 500. Variable optical divider 500 comprises a fixed-orientation half wave plate 502 (commonly referred to as a fixed wave plate), an actuator 510 that controls the position of fixed wave plate 502 relative to light path 112, and a polarizing beam splitter (PBS) 504. In this embodiment, dynamically-controlled polarization device 218 (FIGS. 2A, 2B) comprises actuator 510 coupled to fixed wave plate 502 and PBS 216 (FIGS. 2A, 2B) comprises PBS 504. In this embodiment, actuator 510 is positioned to optionally position fixed wave plate 502 in coherent light path 112 between coherent light source 204 and PBS 504.

The polarization rotation provided by a fixed wave plate depends on the relative orientation of the principal plane of the fixed wave plate with respect to the polarization orientation of the light incident on the fixed wave plate. Specifically, if the polarization orientation of the incident light beam is parallel to the principal plane of the fixed wave plate, no change in the polarization of the incident light beam occurs. However, if the angle between the polarization orientation of the incident light beam and principle plane of the fixed wave plate is an acute angle, the fixed wave plate rotates the polarization plane of the incident light by 2 times that angle.

In the embodiments shown, fixed wave plate 502 is configured to rotate the polarization of an incident light by an amount of between 0 and 90 degrees. As such, fixed wave plate 502 provides a constant polarization effect on an incident coherent light beam. Consistent with the prior examples, in this exemplary application, coherent light beam 201 generated by laser 204 is vertically-polarized, illustrated as vertically-polarized coherent light beam 326 (FIGS. 3A and 3B). As one of ordinary skill in the art would appreciate, fixed wave plate 502 may be any properly oriented fixed wave plate now or later developed that provides a desired polarization of coherent light beam 326. For example, in other embodiments fixed wave plate 502 could be any polarization device that is configured to rotate the polarization of an incident light beam between 0 and 360 degrees. Similarly, in accordance with embodiments of the present invention, fixed wave plate 502 could be a zero-order wave plate or a multi-order wave plate. The selection of the polarization rotation provided by wave plate 502 is described further below.

It would be appreciated by one of ordinary skill in the art that in certain embodiments of the present invention, fixed wave plate 502 may be a fixed-angle wave plate. In such an embodiment, actuator 510 may be a linear actuator or other type of actuator that translates fixed wave plate 502, as described above. It should also be appreciated that in other embodiments, fixed wave plate 502 may be a fixed-position wave plate. In such an embodiment, actuator 510 may be a rotary actuator, as is well-known in the art. The rotary actuator may, for example, rotate the fixed-position wave plate while it is positioned in the light path to achieve a desired polarization rotation. Alternatively, a fixed-position wave plate may be controlled by an actuator to be positioned into and out of the light path to achieve a desired polarization rotation.

The coherent light beam emanating from fixed wave plate 502 is referred to herein as coherent light beam 514. In the embodiment shown in FIG. 5A, PBS 504 divides linearly polarized light beam 514 into two discrete light beams. As noted above with reference to FIG. 2A, one light beam, data light beam 282, is transmitted along data beam path 262 while the other light beam, reference light beam 280, is transmitted along reference beam path 260. In this exemplary embodiment, data light beam 282 is referred to herein as data beam 542, while reference light beam 280 is referred to herein as reference beam 540.

The intensity of light beams 540, 542 depends on the polarization rotation provided by fixed wave plate 502. In one example, fixed wave plate 502 is positioned in coherent light path 112 to rotate the polarization of coherent light beam 326 by approximately 45 degrees. PBS 504 allocates the power of polarized light beam 514 based on the polarization of coherent light beam 514. In the example of fixed wave plate 502 rotating the polarization of vertically-polarized coherent light beam 326 by approximately 45 degrees, PBS 504 divides the resulting vertically-polarized coherent light beam 514 approximately equally across the two discrete light beams 540, 542.

In the read mode embodiment illustrated in FIG. 5B, actuator 510 is controlled to retract fixed wave plate 502 from light path 112. As a result, vertically-polarized light beam 326 does not impinge on fixed wave plate 502. Thus, in the read operational mode, light beam 326 undergoes no rotation of its polarization; that is, PBS 504 receives vertically-polarized coherent light beam 326. Coherent light beam 326 is substantially directly along reconstruction beam path 268, introduced above with reference to FIG. 2B. As described above with reference to FIG. 2B, this light beam is used to reconstruct the data stored in holographic storage disk 238 and, as such, is referred to herein as reconstruction beam 284. In the example illustrated in FIG. 5B, reconstruction beam 284 is referred to as reconstruction light beam 544.

In the embodiment shown in FIGS. 5A and 5B, actuator 510 controls the polarization of the coherent light beam incident on PBS 504 to achieve two different polarizations of light incident on PBS 504. Actuator 510 positions fixed wave plate 502 in light path 112 to rotate the polarization of coherent light 326 resulting in a coherent light 514 having a first desired polarization to be incident on PBS 504. Actuator 510 also removes fixed wave plate 502 from light path 112 to achieve a second desired polarization of light incident on PBS 504. In the example shown in FIG. 5B, the polarization of light incident on PBS 504 has the same vertical polarization as coherent light beam 326.

It should be apparent to one of ordinary skill in the art that any type of actuator or actuation mechanism may be used to position fixed wave plate 502 in light path 112. In one embodiment of the present invention, actuator 510 is a linear actuator. In another embodiment, the actuator is a step motor. In a further embodiment, the actuator is a solenoid. In other embodiments, actuator 510 is an electromechanical actuator such as a microelectromechanical system (MEMS). In still further embodiments of the present invention, actuator 510 is an actuator configured to rotate fixed wave plate 502 around an axis.

It should also be apparent to one of ordinary skill in the art that actuator 510 positions wave plate 502 in or out of light path 112 based on a voltage control signal provided by drive electronics 202 via control signal line 116. In the exemplary embodiments presented herein, drive electronics 202 controls actuator 510 based on the operational mode of holographic memory system 100.

It should also be apparent that in alternative embodiments one or more actuators 510 may each be controlled to adjust one or more fixed wave plates 502. For example, one actuator may control a plurality of fixed wave plates, each being positioned in light path 112 to achieve a desired power allocation. As another example, multiple actuators may be controlled to place a desired combination of fixed wave plates in light path 112, the combined effect of which provides a desired power allocation.

In the embodiment shown in FIGS. 6A and 6B, variable optical divider 214 is referred to as variable optical divider 600. Variable optical divider 600 is similar to variable optical divider 500 described with relation to FIGS. 5A and 5B. However, variable optical divider 600 further comprises an optical block 602 which is included to provide greater flexibility for determining the power of reconstruction beam 644. In the embodiment disclosed in FIGS. 5A and 5B, for example, reconstruction beam 544 is allocated all the power of coherent light bean 626. In alternative embodiments, the power to be allocated to reconstruction beam 644 may be less.

The selected polarization of coherent light beam 626 to achieve this lesser power distribution will result in two discrete light beams being generated by PBS 504 rather than one. In such embodiments, optical block 602 is provided to prevent such a second light beam from traveling along data path 262.

It should also be appreciated that in embodiments of the present invention, PBSs are ideally configured to completely direct an incident light beam in a desired direction. For example, a PBS would ideally reflect 100% of a vertically-polarized coherent light beam in one direction while allowing 100% of a horizontally polarized coherent light beam to pass through in different direction. However, in reality, some light will typically leak through a PBS in undesired directions. This light leakage results from polarization purity or impurity of the incident coherent light beam, as well as from the inherent extinction ratio of a PBS. In certain embodiments, PBSs leak approximately 0.5 to 2% of an incident coherent light beam. This leakage light potentially causes problems in a holographic memory system. As a result, optical block 602 further serves to block the leakage light resulting from the use of a PBS.

As one of ordinary skill in the art would appreciate, there are a myriad of ways that optical block 602 may be controlled in concert with fixed wave plate 502. In the embodiment shown in FIGS. 6A and 6B, optical block 602 is controlled by actuator 610. In the simple arrangement illustrated in FIGS. 6A and 6B, optical block 602 and fixed wave plate 502 are both connected to the same actuating arm of actuator 510 and, as such, move in the same direction.

In such an embodiment, the polarity of coherent light beam 201 is different than the embodiments discussed above with reference to FIGS. 3A-5B. Specifically, in contrast to the other embodiments of the present invention illustrated in FIGS. 3A-5B and 7A-7B, coherent light beam 201 received by variable optical divider 600 is not vertically polarized. Specifically, coherent light beam 201 is a linearly polarized coherent light beam 626.

During the write operational mode, actuator 610 removes wave plate 502 and optical block 602 from light path 112, enabling variable optical divider 600 to produce and allocate power among data beam 542 and reference beam 540. On the other hand, during the read operational mode, actuator 610 inserts wave plate 502 and optical block 602 into light path 112, enabling variable optical divider 600 to produce and allocate power to one light beam, reconstruction light beam 544.

FIGS. 7A and 7B are schematic block diagrams of another embodiment of variable optical divider 214 illustrated in FIGS. 2A and 2B. This embodiment of variable optical divider 214 is referred to herein as variable optical divider 700. Variable optical divider 700 comprises a fixed wave plate 702, an actuator 710 that controls the position of fixed wave plate 702, and a polarizing beam splitter (PBS) 704. Variable optical divider 700 further comprises an additional fixed wave plate 718 described below in more detail. Wave plates 702 and 718 and PBS 704 are sequentially aligned in coherent light path 112 as shown in FIGS. 7A and 7B. Thus, in this embodiment, dynamically-controlled polarization device 218 (FIGS. 2A, 2B) comprises actuator 710 coupled to wave plate 702, and PBS 216 (FIGS. 2A, 2B) comprises PBS 704.

Fixed wave plate 702 rotates the polarization of incident light by an amount of between 0 and 90 degrees. Consistent with prior examples, in this embodiment, coherent light beam 201 generated by laser 204 is vertically-polarized light beam, illustrated as vertically-polarized coherent light beam 326 (FIGS. 3A and 3B). In the write operational mode arrangement illustrated in FIG. 7A, optical divider 700 is operative to divide coherent light beam 326 into two coherent light beams, data beam 742 and reference beam 740. Data beam 742 travels along data beam path 262 (FIGS. 2A and 2B) while reference beam 740 travels along reference beam path 260 (FIGS. 2A and 2B). Coherent light beam 326 is divided along each path 260, 262 as described below. In the arrangement illustrated in FIG. 7B, optical divider 700 is operative to reflect coherent light beam 326 into reconstruction beam 744 which then travels along reconstruction beam path 268.

In the embodiments illustrated in FIGS. 7A and 7B, wave plate 702 is coupled to actuator 710. Actuator 710 is a dynamically-controlled device configured to adjust the position of wave plate 702. Actuator 710 controls the position of wave plate 702 based on a voltage control signal provided by drive electronics 202 via control signal line 116. A U-shaped support frame 712 is mounted to actuator 710 via mount 716. In this embodiment, actuator 710 is a linear actuator that may be controlled to linearly adjust the position of support frame 712 along a linear axis relative to actuator 710.

Support frame 712 comprises two substantially parallel frame members 713A and 713B sufficiently separated to be positioned on opposing sides of PBS 704. In the arrangement illustrated in FIGS. 7A and 7B, frame member 713A extends into coherent light path 112 in front of PBS 704 while frame member 713B extends into light paths 260 and 262 behind PBS 704. Fixed wave plate 702 is connected to a transparent section 715A of frame member 713A fixed while wave plate 718 is connected to a transparent section 715B of frame member 713B. Actuator 710 is configured to adjust the position of wave plates 702 and 718 relative to optical paths 112, 262 and 260.

In the embodiment shown in FIGS. 7A and 7B, variable optical divider 700 further comprises wave plate 718 coupled to actuator 710 via support frame 712. Wave plate 718 is a fixed wave plate that provides a constant polarization rotation of an incident coherent light beam. In the embodiments illustrated in FIGS. 7A and 7B, wave plate 718 is configured to modify the polarization of one or more coherent light beams leaving PBS 704. In particular embodiments of the arrangement shown in FIGS. 7A and 7B, the angular orientation of wave plate 718 is chosen so as to rotate the polarization of the modified coherent light beam by approximately 90 degrees.

As one of ordinary skill in the art would appreciate, fixed wave plate 702 may be any fixed wave plate now or later developed that provides the desired polarization of coherent light beam 326. In the embodiment illustrated in FIGS. 7A and 7B, fixed wave plate 702 provides a polarization rotation of approximately 45 degrees.

PBS 704 divides an incident coherent light beam into one or more discrete light beams. The power of coherent light beam 714 allocated to discrete light beams 740, 742 is based on the polarization of the light beam incident on PBS 704.

In the embodiment shown in FIG. 7A, actuator 710 positions wave plate 718 in data beam path 262. Thus, data beam 742 transmitting along data beam path 262 is further modified by wave plate 718 to achieve desired polarization of the light beam exiting variable optical divider 700. As noted, in the described embodiments, wave plate 718 rotates the polarization of data beam 742 by 90 degrees.

The operation of variable optical divider 700 to achieve a desired polarization of coherent light beam 326 is described next below. FIG. 7A illustrates variable optical divider 700 when holographic memory system 100 is the write operational mode. In an embodiment of the arrangement shown, actuator 710 receives signals from drive electronics 202 indicating a record operation is to occur. In response to a record signal, actuator 710 positions wave plate 702 in light path 112 of coherent light beam 326.

As noted above, when light beam 326 impinges on wave plate 702, wave plate 702 rotates the polarization by approximately 45 degrees. The coherent light beam emanating from fixed wave plate 702 is referred to herein as coherent light beam 714. Coherent light beam 714 then impinges on PBS 704. Because fixed wave plate 702 rotates the polarization by approximately 45 degrees, PBS 704 divides the power allocated among reference beam 740 and data beam 742.

FIG. 7B illustrates variable optical divider 700 when holographic memory system 100 is in the read operational mode. In an embodiment of the arrangement shown, actuator 710 receives signals from drive electronics 202 indicating that actuator 710 is to position fixed wave plate 702 at a location that is not in light path 112 of vertically-polarized light beam 326.

In this arrangement, coherent light beam 326 impinges on PBS 704 without undergoing any polarization rotation. As a result, PBS 704 reflects coherent light beam 326 approximately completely into reconstruction beam 744 directed along reconstruction beam path 268.

In alternative embodiments, PBS 704 is selected to allocate a lesser percentage of the power of coherent light beam 326 to reconstruction beam 744. In said embodiments, the portion of coherent light beam that travels through PBS 704 is prevented from traveling along data beam path 706 by frame member 713B.

In the illustrated embodiment of FIG. 7B, actuator 710 positions wave plate 718 in reconstruction beam path 268. As a result, reconstruction beam 744 along reconstruction beam path 268 is further modified by wave plate 718 to achieve proper polarization of the light beam exiting variable optical divider 700. As noted, in the described embodiments, wave plate 718 rotates the polarization of data beam 742 by 90 degrees. Furthermore, support frame 712 is configured to couple wave plate 718 to actuator 710 is positioned to physically block any light from transmitting along optical path 706.

It should be apparent to one of ordinary skill in the art that any type of actuator or actuation mechanism may be used to position fixed wave plates 702 and 718. In one embodiment of the present invention, actuator 710 is a linear actuator. In another embodiment of the present invention, the actuator is a step motor. In further embodiments of the present invention, the actuator is a solenoid. In other embodiments, actuator 710 is an electromechanical actuator such as a microelectromechanical system (MEMS). In still further embodiments of the present invention, actuator 710 is an actuator configured to rotate fixed wave plates 702 and 718 around an axis.

It should also be apparent to one of ordinary skill in the art that actuator 710 positions wave plates 702 in or out of light path 112 based on a voltage control signal provided by drive electronics 202 via control signal line 116. In the exemplary embodiments presented herein, drive electronics 202 controls actuator 710 based on the operational mode of holographic memory system 100.

It should also be apparent that in alternative embodiments one or more actuators 710 may each be controlled to adjust one or more fixed wave plates. For example, one actuator may control a plurality of fixed wave plates, each being positioned in light path 112 to achieve a desired power allocation.

As another example, multiple actuators may be controlled to place a desired combination of fixed wave plates in light path 112, the combined effect of which provides a desired power allocation.

FIGS. 8A and 8B are schematic block diagrams of one embodiment of optical shutter 276 illustrated in FIGS. 2A and 2B.

As noted, coherent light 201 from laser 204 is reflected by mirror 290 and is directed through optical shutter 276. Optical shutter 276 comprises beam deviation assembly 272, focusing lens 274 and pinhole 206 that collectively shutter coherent light beam 201 from entering the remainder of optical steering subsystem 104. In FIG. 8A the illustrated embodiment of optical shutter 276 is arranged so as to permit passage of coherent light while in FIG. 8B the illustrated embodiment of optical shutter 276 is arranged so as to prevent passage of coherent light.

Coherent light 201 passing through optical shutter 276 enters main expander assembly 212. In this illustrative embodiment, optical shutter 276 makes use of several optical components also used by main expander assembly 212. Although the arrangement of the optical components used in main expander assembly 212 are convenient to accommodate optical shutter 276, it should be appreciated by one of ordinary skill in the art that in alternative embodiments optical shutter 276 may not comprise components also utilized by main expander assembly 212. It should also be appreciated that optical shutter 276 may be placed anywhere in holographic memory system 100 at which control of a focused light beam is desired.

The embodiment of optical shutter 276 shown in FIGS. 8A and 8B is referred to herein as optical shutter 800. Optical shutter 800 comprises a light beam deviation assembly 804, a focusing lens 806 and a pinhole 808 sequentially aligned in light path 112 of coherent light beam 201, as shown in FIGS. 8A and 8B.

In embodiment illustrated in FIGS. 8A and 8B, coherent light beam 201 is incident on light deviation assembly 804. Light deviation assembly 804 is configured to reflect coherent light beam 201 through focusing lens 806 at a predetermined angle depending on the angular position of the light deviation assembly relative to light path 112. The angular position of light deviation assembly 804 depends on a control voltage applied by drive electronics 202 via signal line 116. The choice of angular position of light deviation assembly 804 is described in more detail below.

Focusing lens 806 is configured to focus coherent light beam 201 towards pinhole aperture device 812. Pinhole aperture device 812 is positioned such that pinhole 808 resides in the focal plane 810 of focusing lens 806.

In the arrangement shown in FIG. 8A, optical shutter 800 is configured to permit the passage of light beam 802. In this arrangement, light deviation assembly 804 is positioned at an angular position such that focusing lens 806 receives coherent light beam 201 at an angle allowing focusing lens 806 to focus coherent light beam 201 precisely at pinhole 808. In the arrangement of FIG. 8A, focused light beam 802 passes through pinhole 808 and exits optical shutter 276.

In the arrangement shown in FIG. 8B, optical shutter 800 is configured to block the passage of coherent light beam 201. In this arrangement, light deviation assembly 804 is positioned so as to reflect light beam 201 through focusing lens 806 at an angle different from the angle used in the arrangement illustrated in FIG. 8A. In this arrangement, light deviation assembly 804 deviates the angle of coherent light beam 201 by a predetermined amount so as to cause the focal point of focused light beam 201 to translate to a position away from pinhole 808. Thus, in this arrangement, focused light beam 802 does not pass through pinhole 808 and is prevented from exiting optical shutter 276.

In the embodiments described in FIGS. 8A and 8B, the angle at which light deviation assembly 804 reflects coherent light beam 201 depends on the characteristics of focusing lens 806 and the size of pinhole 808. It is a fundamental principal of optics that a lens will transform the angular deviation of light incident on the lens into a translation of the focal point of the incident light. Thus, the amount of deviation depends on the focal length of focusing lens 806 and the translation required to move the focused point from pinhole 808.

In embodiments of the present invention, various apparatus may be used as light deviation assembly 804 in order to achieve the desired beam deviation. In one embodiment of the present invention, light deviation assembly 804 comprises a mirror controlled by an actuation mechanism. In this embodiment, the mirror reflects light beam 802 at an angle determined by the position of the actuation mechanism. The position of actuation mechanism is determined by control signals from drive electronics 202 of holographic memory system 100.

In embodiments of the present invention, the actuation mechanism comprises an electromechanical actuator. In other embodiments, light deviation assembly 804 comprises an electro-optical deviation assembly. For example, in one embodiment, electro-optical deviation assembly is an electro-optic modulator.

In further embodiments of the present invention, light deviation assembly comprises an acousto-optic deviation assembly. For example, in one embodiment, acousto-optic deviation assembly comprises an acousto-optic deflector. In other embodiments, acousto-optic deviation assembly comprises an acousto-optic modulator.

FIGS. 9A and 9B are schematic block diagrams of another embodiment of optical shutter 276 illustrated in FIGS. 2A and 2B. In this embodiment, coherent light 201 from laser 204 is reflected by mirrors 290 and 272 and is directed through optical shutter 276. Optical shutter 276 comprises focusing lens 274, pinhole 206, and actuator 902 that collectively shutter coherent light beam 201 from entering the remainder of optical steering subsystem 104. In FIG. 9A the illustrated embodiment of optical shutter 276 is arranged so as to permit passage of coherent light while the illustrated embodiment of optical shutter 276 in FIG. 9B is arranged so as to prevent passage of coherent light.

Coherent light 201 passing through optical shutter 276 enters main expander assembly 212. In this illustrative embodiment, optical shutter 276 makes use of several optical components also used by main expander assembly 212. Although the arrangement of the optical components used in main expander assembly 212 are convenient to accommodate optical shutter 276, it should be appreciated by one of ordinary skill in the art that in alternative embodiments optical shutter 276 may not comprise components also utilized by main expander assembly 212. It should also be appreciated that optical shutter 276 may be placed anywhere in holographic memory system 100 at which control of a focused light beam is desired.

The embodiment of optical shutter 276 shown in FIGS. 9A and 9B is referred to herein as optical shutter 900. Optical shutter 900 comprises a focusing lens 806, a pinhole 808, and an actuator 902. Focusing lens 806 is sequentially aligned in light path 112 of coherent light beam 201 with pinhole 808, positioned between coherent light source 204 and pinhole 808, as shown in FIGS. 9A and 9B. Actuator 902 is coupled to focusing lens 806 to control the position of focusing lens 806 with respect to light path 112. In the illustrated embodiments, actuator 902 controls the position of focusing lens 806 based on a signal from drive electronics 202 via signal line 116.

In the embodiment illustrated in FIGS. 9A and 9B, coherent light beam 201 is incident on focusing lens 806. Focusing lens 806 is configured to focus coherent light beam 201 towards pinhole aperture device 812. Pinhole aperture device 812 is positioned such that pinhole 808 resides in the focal plane 810 of focusing lens 806.

In the arrangement shown in FIG. 9A, optical shutter 900 is configured to permit the passage of coherent light beam 201. In this arrangement, focusing lens 806 is positioned by actuator 902 such that focusing lens 806 focuses coherent light beam 201 precisely at pinhole 808. In the arrangement of FIG. 9A, focused coherent light beam 201 passes through pinhole 808 and exits optical shutter 276.

In the arrangement shown in FIG. 9B, optical shutter 900 is configured to block the passage of coherent light beam 201. In this arrangement, actuator 902 positions focusing lens 806 such that the focal point of focused light beam 201 is not incident on pinhole 808. Thus, in this arrangement, focused light beam 802 does not pass through pinhole 808 and is prevented from exiting optical shutter 276.

It should be apparent that actuator 902 could be any actuator configured to control the position of focusing lens 806 relative to light path 112. In one embodiment of the present invention, actuator is a linear actuator configured to translate the position of focusing lens 806 relative to light path 112. In further embodiments of the present invention, actuator 902 is a rotary actuator configured to rotate focusing lens 806 relative to light path 112. For example, a voice coil actuator could be used to linearly translate or rotate focusing lens 806.

In other embodiments, a piezo device such as a piezo-mechanical or piezo-electrical actuator may be used to control the position of focusing lens 806.

Figure 10A:
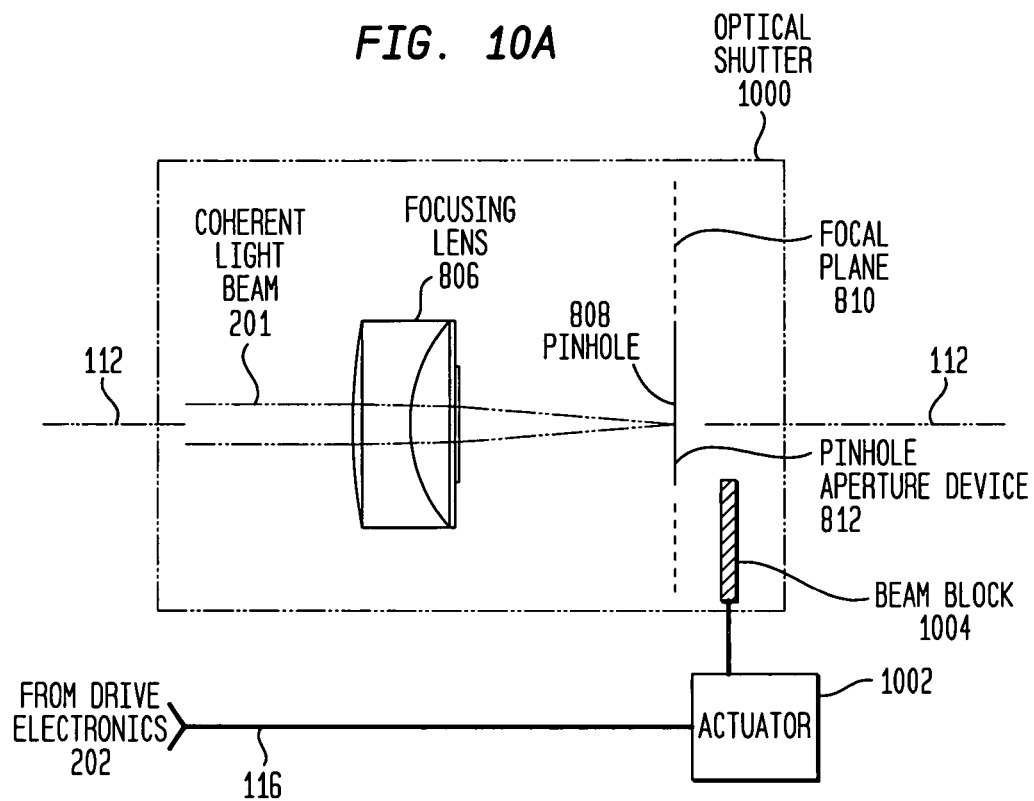
FIG. 10A is a schematic block diagram of one embodiment of the optical shutter illustrated in FIGS. 2A and 2B, arranged so as to permit passage of coherent light.
Figure 10B:
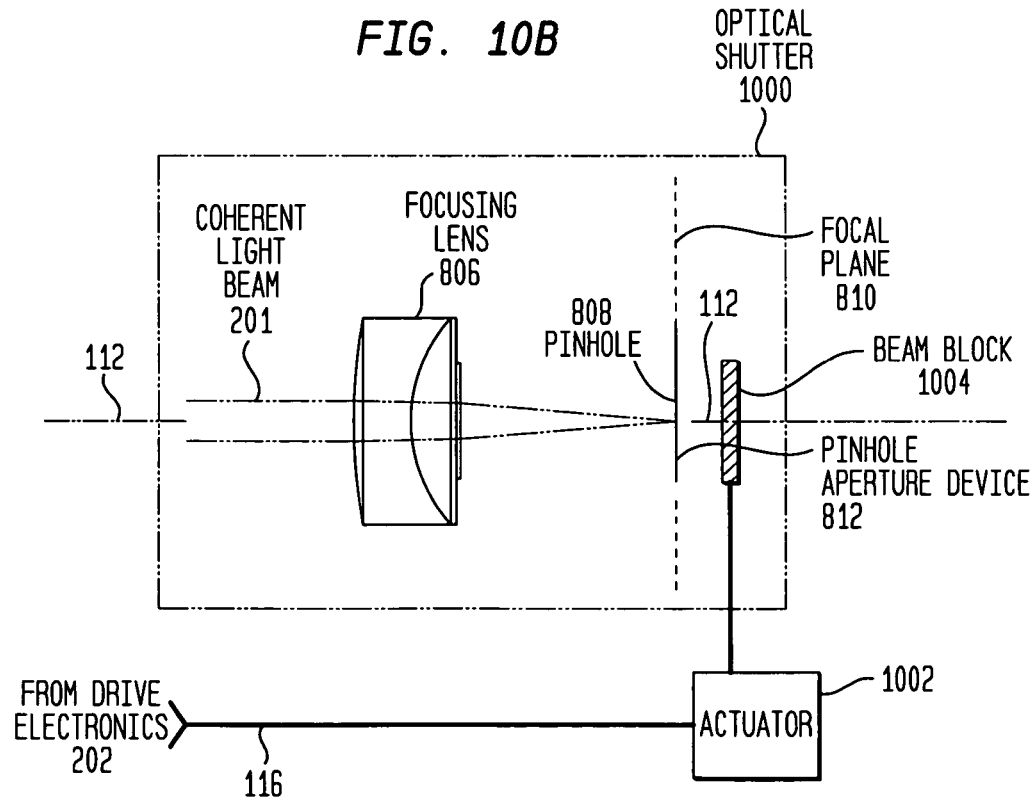
FIG. 10B is a schematic block diagram of one embodiment of the optical shutter illustrated in FIGS. 2A and 2B, arranged so as to block the passage of coherent light.

FIGS. 10A and 10B are schematic block diagrams of one embodiment of optical shutter 276 illustrated in FIGS. 2A and 2B. In this embodiment, coherent light 201 from laser 204 is reflected by mirrors 290 and 272 and is directed through optical shutter 276. Optical shutter 276 comprises focusing lens 274, pinhole 206, and actuator 1002 that collectively shutter coherent light beam 201 from entering the remainder of optical steering subsystem 104. In FIG. 9A the illustrated embodiment of optical shutter 276 is arranged so as to permit passage of coherent light while in FIG. 10B the illustrated embodiment of optical shutter 276 is arranged so as to prevent passage of coherent light.

Coherent light 201 passing through optical shutter 276 enters main expander assembly 212. In this illustrative embodiment, optical shutter 276 makes use of several optical components also used by main expander assembly 212. Although the arrangement of the optical components used in main expander assembly 212 are convenient to accommodate optical shutter 276, it should be appreciated by one of ordinary skill in the art that in alternative embodiments optical shutter 276 may not comprise components also utilized by main expander assembly 212. It should also be appreciated that optical shutter 276 may be placed anywhere in holographic memory system 100 at which control of a focused light beam is desired.

The embodiment of optical shutter 276 shown in FIGS. 10A and 10B is referred to herein as optical shutter 1000. Optical shutter 1000 comprises a focusing lens 806, a pinhole 808, and an actuator 1002 coupled to a beam block 1004. Focusing lens 806 is sequentially aligned in light path 112 of coherent light beam 201 with pinhole 808, positioned between coherent light source 204 and pinhole 808, as shown in FIGS. 10A and 10B. Actuator 1002 is coupled to beam block 1004 to control the position of beam block 1004 with respect to light path 112. In the illustrated embodiments, actuator 902 controls the position of beam block 1004 based on a signal from drive electronics 202 via signal line 116.

In the embodiment illustrated in FIGS. 10A and 10B, coherent light beam 201 is incident on focusing lens 806. Pinhole aperture device 812 is positioned such that pinhole 808 resides in the focal plane 810 of focusing lens 806. As a result, focusing lens 806 is configured to focus coherent light beam 201 into a focused light beam at pinhole 808. Focused light beam 808 then passes through pinhole 808.

In the arrangement shown in FIG. 10A, optical shutter 1000 is configured to permit the passage of coherent light beam 201. In this arrangement, actuator 1002 positions beam block 1004 so that beam block 1004 is not in coherent light path 112. As a result, coherent light beam 201 passes through optical shutter 276.

In the arrangement shown in FIG. 10B, optical shutter 1000 is configured to block the passage of coherent light beam 201. In this arrangement, actuator 1002 positions beam block 1004 in light path 112. As a result, coherent light beam 201 passes through pinhole 808, coherent light beam 201 is blocked from exiting shutter 276.

It should be apparent that actuator 1002 could be any actuator configured to control the position of beam block 1004 relative to light path 112. In one embodiment of the present invention, actuator 1002 is a linear actuator configured to translate the position of beam block 1004 relative to light path 112. In further embodiments of the present invention, actuator 1002 is a rotary actuator configured to rotate beam block 1004 relative to light path 112. For example, a voice coil actuator could be used to linearly translate or rotate beam block 1004.

In other embodiments, a piezo device such as a piezo-mechanical or piezo-electrical actuator may be used to control the position of beam block 1004.

It the embodiment illustrated in FIGS. 10A and 10B, beam block 1004 is shown in light path 112 behind pinhole aperture device 812 relative to focusing lens 806. It would be apparent to one of ordinary skill in the art that actuator 1002 could be configured to position beam block 1004 in light path 112 between focusing lens 806 and pinhole 808 to block light from entering pinhole 808.

In other embodiments of the present invention, optical shutter 276 comprises optical divider 214 as described above in detail.

Although the present invention has been fully described in conjunction with several embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom. The present embodiments are, therefore, to be considered in all respects as illustrative and not restrictive.

All documents, patents, journal articles and other materials cited in the present application are hereby incorporated by reference.

What is claimed is:

1. A holographic memory system comprising:
   a photosensitive holographic storage medium which holographically stores information;
   a source of a coherent light beam; and
   an optical steering subsystem for directing the coherent light beam to the holographic storage medium comprising: a variable optical divider comprising:
      at least one polarization device dynamically controllable to manipulate polarization of the coherent light beam to generate a polarized coherent light beam having a particular polarization; and at least one polarizing beam splitter which redirects the polarized coherent light beam into one or more discrete light beams and which dynamically allocates power of the polarized coherent light beam among the one or more discrete light beams based on the polarization of the polarized coherent light beam;

wherein the one or more discrete light beams are a reference light beam, a data light beam or a reconstruction light beam;

wherein the at least one polarizing beam splitter redirects and dynamically allocates the power of the polarized coherent light beam into the reference light beam and the data light beam when the system is in a write operational mode;

wherein the at least one polarizing beam splitter redirects and dynamically allocates the power of the polarized coherent light beam into the reconstruction light beam when the system is in a read operational mode.

2. The system of claim 1, wherein the at least one dynamically-controlled polarization device is constructed and arranged to dynamically polarize the coherent light beam by predetermined amounts based on the operational mode of the system.

3. The system of claim 2, wherein the dynamically-controlled polarization device comprises:

at least one liquid crystal polarization device.

4. A method of operating a holographic memory system having a holographic recording medium which holographically stores information, the method comprising the following steps:

generating a coherent light beam;

dynamically controlling at least one polarization device to manipulate polarization of the coherent light beam to thereby generate a polarized coherent light beam having a particular polarization;

using at least one polarizing beam splitter to redirect the polarized coherent light beam into one or more discrete light beams and to dynamically allocate power of the polarized coherent light beam among the one or more discrete light beams based on the polarization of the polarized coherent light beam; and directing the one or more discrete light beams to the holographic storage medium;

wherein the one or more discrete light beams are a reference light beam, a data light beam or a reconstruction light beam;

wherein the at least one polarizing beam splitter redirects and dynamically allocates the power of the polarized coherent light beam into the reference light beam and the data light beam when the system is in a write operational mode;

wherein the at least one polarizing beam splitter redirects and allocates dynamically the power of the polarized coherent light beam into the reconstruction light beam when the system is in a read operational mode.

5. The method of claim 4, wherein dynamically controlling the at least one polarization device to manipulate polarization of the coherent light beam comprises:

dynamically polarizing the coherent light beam by predetermined amounts based on the operational mode of the system.

6. The method of claim 5, wherein the dynamically polarizing the coherent light beam comprises:

dynamically polarizing the coherent light beam with at least one liquid crystal rotator.

7. The method of claim 6, wherein dynamically polarizing the coherent light comprises:

dynamically positioning at least one wave plate to a desired position relative to said coherent light beam to adjust the polarization of said coherent light beam entering said polarizing beam splitter.

8. The method of claim 5, wherein dynamically polarizing said coherent light comprises:

dynamically rotating at least one wave plate to a desired position relative to said coherent light beam to adjust the polarization of the coherent light beam entering said polarizing beam splitter.

9. A holographic memory system comprising:

a means for holographically storing information;

a means of providing a coherent light beam; and an optical steering means for directing the coherent light beam to the means for holographically storing information, the optical steering means comprising: a variable optical divider having:

means for dynamically manipulating polarization of the coherent light beam for generating a polarized coherent light beam having a particular polarization; and polarizing beam splitting means for redirecting the polarized coherent light beam into one or more discrete light beams and for dynamically allocating power of the polarized coherent light beam among the one or more discrete light beams based on the polarization of the polarized coherent light beam;

wherein the one or more discrete light beams are a reference light beam, a data light beam or a reconstruction light beam;

wherein the polarizing beam splitting means redirects and dynamically allocates the power of the polarized coherent light beam into the reference light beam and the data light beam when the system is in a write operational mode;

wherein the polarizing beam splitting means redirects and dynamically allocates the power of the polarized coherent light beam into the reconstruction light beam when the system is in a read operational mode.

10. The system of claim 9, wherein the means for dynamically manipulating polarization dynamically manipulates polarization of the coherent light beam by predetermined amounts based on the operational mode of the system.

* * * * *